United States Patent
Wang et al.

(10) Patent No.: US 12,020,125 B2
(45) Date of Patent: Jun. 25, 2024

(54) METHOD, ELECTRONIC DEVICE, AND COMPUTER PROGRAM PRODUCT FOR INFORMATION PROCESSING

(71) Applicant: EMC IP Holding Company LLC, Hopkinton, MA (US)

(72) Inventors: Zijia Wang, WeiFang (CN); Chenxi Hu, Beijing (CN); Jiacheng Ni, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 712 days.

(21) Appl. No.: 17/191,299

(22) Filed: Mar. 3, 2021

(65) Prior Publication Data

US 2022/0245513 A1    Aug. 4, 2022

(30) Foreign Application Priority Data

Jan. 29, 2021    (CN) .......................... 202110129341.9

(51) Int. Cl.
*G06N 20/00* (2019.01)
*G06F 9/455* (2018.01)
(Continued)

(52) U.S. Cl.
CPC ............. *G06N 20/00* (2019.01); *G06F 9/455* (2013.01); *H04L 67/568* (2022.05)

(58) Field of Classification Search
None
See application file for complete search history.

(56) References Cited

U.S. PATENT DOCUMENTS

2012/0041914 A1\* 2/2012 Tirunagari ............ G06F 12/121
  706/15
2021/0012227 A1\* 1/2021 Fang .................... H04L 41/5067
(Continued)

FOREIGN PATENT DOCUMENTS

EP         3951661 A1 \*  2/2022 ............. G06N 20/00
WO  WO-2021253168 A1 \* 12/2021 ......... G06F 12/0877

OTHER PUBLICATIONS

L. Saino et al., "Icarus: A Caching Simulator for Information Centric Networking (ICN)," Seventh International Conference on Simulation Tools and Techniques, Mar. 2014, 10 pages.
(Continued)

*Primary Examiner* — Natisha D Cox
(74) *Attorney, Agent, or Firm* — Ryan, Mason & Lewis, LLP

(57) ABSTRACT

Embodiments of the present disclosure provide a method, an electronic device, and a computer program product for information processing. In an information processing method, a first network state representation and a first content request event of an emulated network are provided from an emulator to an agent for reinforcement learning, wherein the first content request event indicates that a request node in the emulated network requests target content stored in a source node. The emulator receives first action information from the agent, wherein the first action information indicates a first caching action determined by the agent, the first caching action including caching the target content in at least one caching node between the request node and the source node. The emulator collects, based on the execution of the first caching action in the emulated network, first training data for training the agent.

20 Claims, 17 Drawing Sheets

(51) Int. Cl.
*H04L 29/08* (2006.01)
*H04L 67/568* (2022.01)

(56) References Cited

U.S. PATENT DOCUMENTS

2021/0174240 A1* 6/2021 Chakraborti ...... G06F 16/24578
2022/0014963 A1* 1/2022 Yeh .......................... G06N 7/01
2022/0138874 A1* 5/2022 Joo ...................... G06F 11/3058
700/286

OTHER PUBLICATIONS

B. Ahlgren et al., "A Survey of Information-Centric Networking," IEEE Communications Magazine, vol. 50, No. 7, Jul. 2012, pp. 26-36.

J. Morley et al., "Digitalisation, Energy and Data Demand: The Impact of Internet Traffic on Overall and Peak Electricity Consumption," Energy Research & Social Science, vol. 38, Feb. 17, 2018, pp. 128-137.

D. S. Jat et al., "An Intelligent Wireless QoS Technology for Big Data Video Delivery in WLAN," International Journal of Ambient Computing and Intelligence, vol. 9, No. 4, Oct.-Dec. 2018, 4 pages.

W. Liu et al., "Coupling DAS, SVC and NDN: An SVC-aware Cache and Forwarding Policy for NDN Routers," In Proceedings of the 2018 1st IEEE International Conference on Hot Information-Centric Networking, Aug. 2018, 6 pages.

U.S. Appl. No. 17/200,986 filed in the name of Zijia Wang et al., filed Mar. 15, 2021, and entitled "Model Training Method, Data Processing Method, Electronic Device, and Program Product."

* cited by examiner

METHOD, ELECTRONIC DEVICE, AND COMPUTER PROGRAM PRODUCT FOR INFORMATION PROCESSING

RELATED APPLICATION(S)

The present application claims priority to Chinese Patent Application No. 202110129341.9, filed Jan. 29, 2021, and entitled "Method, Electronic Device, and Computer Program Product for Information Processing," which is incorporated by reference herein in its entirety.

FIELD

Embodiments of the present disclosure relate generally to information technologies and computer technologies, and more particularly to a method, an electronic device, and a computer program product for information processing.

BACKGROUND

Information-centric network (ICN) architectures attempt to change the focus of current Internet architectures. Previous network architectures focus on creating a conversation between two machines. This is evident, for example, in a naming system where a uniform resource locator (URL) is resolved through a domain name system (DNS) and indicates the machine with which it intends to communicate to receive data or perform operations. In contrast, the goal of the ICN architecture is to shift the focus from connecting to another machine to acquiring data. In the ICN architecture, data or content becomes independent of locations, applications, and storage and transmission approaches, thus making it possible to cache and replicate the data or content within the network.

On the other hand, reinforcement learning (RL) is becoming more and more popular due to its flexibility and good performance. Before reinforcement learning is applied to a real scenario, a corresponding training environment that can interact with a reinforcement learning agent is a necessary part. However, in most cases, this environment interacting with the agent is unavailable. Unfortunately, this is no exception when applying reinforcement learning to caching systems targeting ICNs. However, the ICN architecture reduces, to some extent, the overwhelming workload brought about by new technologies such as 5G. The cache mechanism is one of the core ideas of ICNs, and it can bring many benefits to such networks. Therefore, it may be desirable to use reinforcement learning to make more optimized caching strategies in ICNs or any other network where content can be cached.

SUMMARY

Embodiments of the present disclosure provide an emulator for a reinforcement learning environment and a technical solution for interaction between the emulator and an agent, wherein the emulator can be used to emulate a network caching system and can interact with the agent for reinforcement learning to train the agent to make optimized content caching decisions in the network. More specifically, the embodiments of the present disclosure provide a method, an electronic device, and a computer program product for information processing.

In a first aspect of the present disclosure, an information processing method is provided. This method includes: providing a first network state representation and a first content request event of an emulated network from an emulator to an agent for reinforcement learning, wherein the first content request event indicates that a request node in the emulated network requests target content stored in a source node. The method further includes: receiving first action information from the agent, wherein the first action information indicates a first caching action determined by the agent, the first caching action including caching the target content in at least one caching node between the request node and the source node. The method further includes: collecting, based on the execution of the first caching action in the emulated network, first training data for training the agent.

In a second aspect of the present disclosure, an electronic device is provided. The electronic device includes at least one processor and at least one memory storing computer program instructions. The at least one memory and the computer program instructions are configured to cause, along with the at least one processor, the electronic device to: provide a first network state representation and a first content request event of an emulated network from an emulator to an agent for reinforcement learning, wherein the first content request event indicates that a request node in the emulated network requests target content stored in a source node. The at least one memory and the computer program instructions are further configured to cause, along with the at least one processor, the electronic device to: receive first action information from the agent, wherein the first action information indicates a first caching action determined by the agent, the first caching action including caching the target content in at least one caching node between the request node and the source node. The at least one memory and the computer program instructions are further configured to cause, along with the at least one processor, the electronic device to: collect, based on the execution of the first caching action in the emulated network, first training data for training the agent.

In a third aspect of the present disclosure, a computer program product is provided. The computer program product is tangibly stored on a non-volatile computer-readable medium and includes machine-executable instructions. The machine-executable instructions, when executed, cause a machine to execute steps of the method according to the first aspect.

It should be understood that the content described in this Summary is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become readily understandable by reading the following detailed description with reference to the accompanying drawings. In the accompanying drawings, several embodiments of the present disclosure are shown by way of example and not limitation.

Throughout all the accompanying drawings, the same or similar reference numerals are used to indicate the same or similar components.

DETAILED DESCRIPTION

Figure 1:
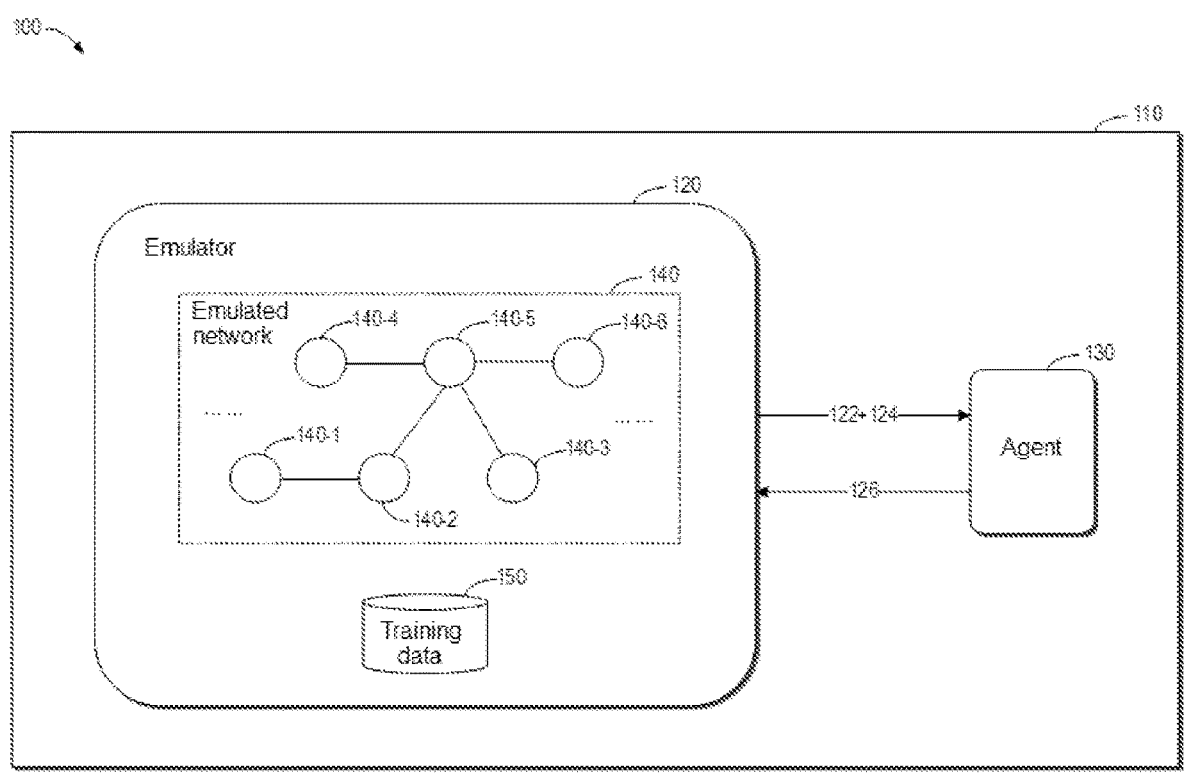
FIG. 1 illustrates a schematic diagram of an example information processing environment in which embodiments of the present disclosure may be implemented.

The principles and spirit of the present disclosure will be described below with reference to several example embodiments shown in the accompanying drawings. It should be understood that these embodiments are described only for the purpose of enabling a person skilled in the art to better understand and then implement the present disclosure, instead of limiting the scope of the present disclosure in any way. In the description and claims herein, unless otherwise defined, all technical and scientific terms used herein have meanings that are commonly understood by those of ordinary skill in the art to which the present disclosure belongs.

As mentioned above, it may be desirable to use reinforcement learning to make more optimized caching strategies in information-centric networks (ICNs) or any other network where content can be cached. As a brief introduction, an ICN is an approach to move Internet infrastructure away from the host-centric paradigm. Due to the development of 5G and other technologies, ICNs are also known as an important area mentioned in strategic roadmaps of various companies or other entities, and many related studies have been conducted. In an ICN, it is important to find a good method of managing a caching system. In this case, reinforcement learning (RL) may be a good choice. However, an environment may be required to train an RL algorithm. Currently, there are no emulators available for testing and training an RL agent.

In view of these problems and other potential problems in conventional solutions, embodiments of the present disclosure provide an emulator for a reinforcement learning environment and a technical solution for interaction between an emulator and an agent, wherein the emulator can be used to emulate a network caching system and can interact with an agent for reinforcement learning to train the agent to make optimized content caching decisions in a network. In the embodiments of the present disclosure, a first network state representation and a first content request event of an emulated network are provided from an emulator to an agent for reinforcement learning, wherein the first content request event indicates that a request node in the emulated network requests target content stored in a source node. Next, the emulator receives first action information from the agent, wherein the first action information indicates a first caching action determined by the agent, the first caching action including caching the target content in at least one caching node between the request node and the source node. Then, the emulator collects, based on the execution of the first caching action in the emulated network, first training data for training the agent. In this manner, the embodiments of the present disclosure provide a simple emulator and an efficient training solution to an agent for content caching decision-making. Some example embodiments of the present disclosure will be described below with reference to the accompanying drawings.

FIG. 1 illustrates a schematic diagram of example information processing environment 100 in which the embodiments of the present disclosure may be implemented. As shown in FIG. 1, information processing environment 100 may include computing device 110 for implementing emulator 120 and agent 130. It should be noted that both emulator 120 and agent 130 can be implemented in software, hardware, or a combination of both. It should also be noted that although emulator 120 and agent 130 are shown as being implemented in the same computing device 110 in FIG. 1, this is only an example and is not intended to limit the scope of the present disclosure in any way. In other embodiments, emulator 120 and agent 130 can be implemented in different computing devices, respectively. Alternatively, one or both of emulator 120 and agent 130 can be implemented in multiple computing devices in a distributed manner.

In some embodiments, emulator 120 can emulate an environment for which reinforcement learning needs to be performed by agent 130, and agent 130 is a model, algorithm, or other form or entity for performing reinforcement learning on the environment emulated by emulator 120. For example, in the example of FIG. 1, emulator 120 can provide network 140 that is emulated, which is also referred to as emulated network 140 hereinafter. As an example, emulated network 140 may include multiple nodes, such as nodes 140-1 to 140-6, for example. In some embodiments, emulated network 140 may have a certain network topology. For example, in the example of FIG. 1, node 140-1 is connected to node 140-2, nodes 140-2 and 140-3 are connected to node 140-5, and node 140-5 is connected to nodes 140-4 and 140-6. It is to be noted that the particular number of nodes and the particular network topology structure illustrated in FIG. 1 are merely schematic and are not intended to limit the scope of the present disclosure in any way. In other embodiments, emulated network 140 may have any number of nodes and any network topology structure. In addition, in some embodiments, the number of nodes and the topology structure of emulated network 140 may be dynamic, that is, may change over time.

In emulated network 140, there may be content stored in part or all of the nodes (e.g., nodes 140-1 to 140-6, etc.). As used herein, "content" can generally refer to any data or information that can be transmitted and cached between different nodes. It will be understood that the content stored in different nodes may be the same or different, and the number of pieces of content stored in different nodes may be the same or different. Therefore, in some cases, a certain node may need to obtain target content that it does not have. In this case, this node can request a source node in emulated network 140 that stores this target content to transmit this target content to this request node. The transmission of the target content from the source node to the request node may pass through one or more intermediate nodes. In some cases, one or more of these intermediate nodes can cache this target content so that when another node subsequently requests this target content again, these caches can serve as source nodes for providing this target content. For simplicity of description, a node that caches the target content can be referred to as a caching node.

It should be noted that in the context of the present disclosure, "request node" may generally refer to a node that makes a content request, "source node" may generally refer to a node of which the stored content is requested, and "caching node" may generally refer to a node that caches the transmitted content. In some embodiments, the "request node," the "source node," and the "caching node" can be functionally or structurally identical nodes that may differ only in that the source node stores content that the request node and the caching node do not have, and the request node and the caching node may differ only in whether a content request is made. In other embodiments, the "request node," the "source node," and the "caching node" can also be nodes that are structurally and functionally different. For example, the "source node" may be a node with more powerful functions and a more complex structure, such as a server in a computer network, a base station in a communication network, and so on. In contrast, the "request node" or the "caching node" may be a node with relatively weak functions and a relatively simple structure, such as an ordinary computer in a computer network, a mobile terminal in a communication network, and so on. In some cases, the "caching node" may also be a node whose function or structure is between the "source node" and the "request node." In other embodiments, the "caching node" may be functionally and structurally identical to the "source node" or the "request node."

In general, emulated network 140 provided by emulator 120 may be any network in which the request node can request content from the source node and the caching node can cache that content during the transmission of that content. In some embodiments, emulated network 140 may be an ICN. In an ICN, data or content becomes unrestricted by locations, applications, and storage and transmission approaches, so it can be cached and replicated in the network. In this way, the caching node can cache a subset of the content or data and can act as a layer that can provide fast data access to the request node (e.g., a client terminal) while reducing the service pressure on the source server. The caching node may be located locally on a device (e.g., a smart phone memory), at the edge of a network (e.g., a content delivery network (CDN)), hosted near a database server (e.g., Redis), or a combination of the foregoing.

To some extent, the ICN architecture solves some of the problems by shifting the focus, but raises some new problems. For example, when content is delivered, a determination is made as to which node should be chosen to cache this content (cache allocation). A second problem arises after the node to cache the content is selected, that is, the sizes of storage space of these caching nodes may be limited, especially when the caching nodes are deployed on client terminal devices. When the cached content exceeds their maximum capacities, a cache eviction algorithm needs to be used to decide which content to evict (cache replacement). Fortunately, reinforcement learning can help in this situation. In general, in some embodiments of the present disclosure, emulator 120 and agent 130 can be designed to focus primarily on how to emulate the cache allocation process and the cache replacement process.

As mentioned above and further illustrated in FIG. 1, emulator 120 can interact with agent 130 for reinforcement learning to train or test agent 130. Because of the universality, reinforcement learning has also been studied in game theory, cybernetics, operations research, information theory, emulation library optimization, and many other disciplines. Formally, reinforcement learning is a sequential decision-making process in which agent 130 for reinforcement learning can learn optimal strategies by interacting with the environment (e.g., emulated network 140 provided by emulator 120). A process of interaction between an agent and an environment in reinforcement learning is briefly presented below with reference to FIG. 2.

Figure 2:
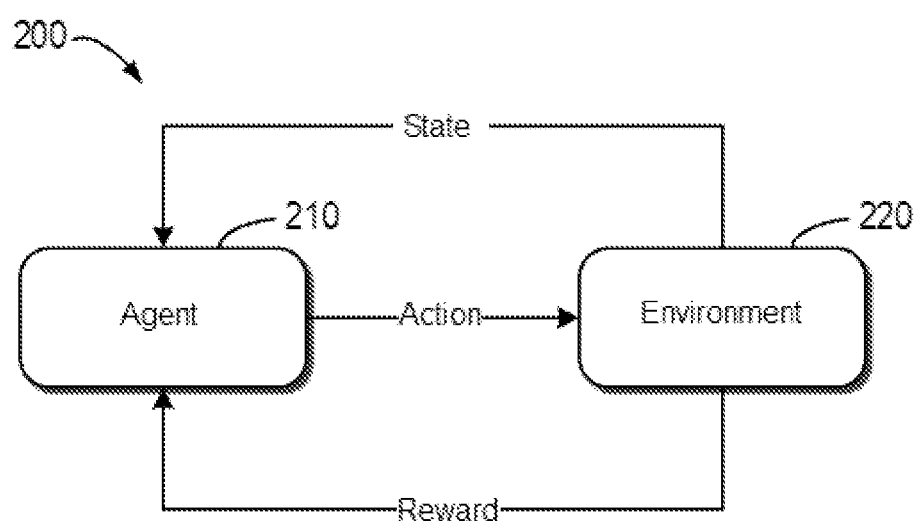
FIG. 2 illustrates interaction between an agent and an environment in reinforcement learning settings according to embodiments of the present disclosure.

FIG. 2 illustrates interaction 200 between agent 210 and environment 220 in reinforcement learning settings according to embodiments of the present disclosure. In some embodiments, agent 130 depicted in FIG. 1 may be considered as an example of agent 210 in FIG. 2, and emulated network 140 provided by emulator 120 in FIG. 1 may be considered as an example of environment 220 in FIG. 2. As shown in FIG. 2, in the process of interaction 200 between agent 210 and environment 220, environment 220 may provide agent 210 with a state related to environment 220. Agent 210 can then determine, based on the state provided by environment 220, an action to be performed in environment 220. Next, environment 220 can determine, by performing the action indicated by agent 210, a reward (positive reward or negative reward, i.e., punishment) to be given to this action to indicate to agent 210 whether this action is good (encouraged) or bad (to be avoided). In general, the goal of agent 210 is to maximize the expected sum of future rewards, which can be achieved by training in multiple steps (state-action transitions) and selecting the action that returns the maximum discounted expected reward function.

Generally, reinforcement learning algorithms can be divided into two categories, i.e., model-based and model-free. In a model-free algorithm, agent 210 has no systematic prior knowledge, and instead, it performs actions in a real environment to learn the impact of the actions on environment 220. Thus, model-free algorithms do not require inputs from developers, and are very flexible and easy to set up. In contrast, a model-based algorithm learns a model of the environment, and then agent 210 continues to learn from its interaction with the resulting environment model. This environment model provides more emulation steps for agent 210, so that agent 210 converges to the optimal strategy more quickly. However, model-based methods may be very challenging in design, since the environment model must accurately reflect the actual environment. Thus, in some embodiments, in order to easily utilize the system provided by embodiments of the present disclosure in practice, emulator 120 provided by the present disclosure can be implemented for model-free reinforcement learning algorithms and can use a weighted reward system to reflect the requirements in certain scenarios. Of course, in other embodiments, emulator 120 provided by the present disclosure may also be implemented for model-based reinforcement learning algorithms.

As described above, the basis of reinforcement learning training is an interactive environment. Emulator 120 for reinforcement learning typically needs to have the following features in order to interact with agent 130 for reinforcement learning. The first feature that may be needed is a state representation of the environment. Typically, a state representation of an environment may be an object or a data array that matches sensor readings in an actual environment. For reinforcement learning, it may be important that the state has Markov attributes so that the prediction of values can be accurate. For some environments, this means computing the resulting values from observations, or representing a combined history of the most recent observations from a sensor as a state. For example, the state can be stored in an internal representation of the environment, which is a typical object-oriented approach. For another example, the state can also be passed as a parameter to other functions. In some embodiments, a simple state representation may be a fixed-size number array that can represent important features of the environment. For convenience, these numbers can be scaled between −1 and 1 when used with a neural network.

In addition, another feature that emulator 120 for reinforcement learning may need may be an action representation. For example, a simple action representation may be an integer that can identify which of N actions starting from 0 is selected. This allows for a basic index lookup when examining the value function estimation. In addition, a further feature that emulator 120 for reinforcement learning may need may be a reward function. This may be part of problem definition. It may sometimes be desirable to have the reward function (e.g., code) as part of the environment or part of the agent, or somewhere in between, depending on how likely it is to be changed. For example, if multiple experiments need to be run to optimize different aspects of the control, but need to be in the same environment, a completely independent reward calculation module can be made and combined with agent 130 (e.g., the agent code) and the environment (e.g., the environment code) at a high level.

Generally, the design of the reward function may be a complex subject. However, a basic principle of the design may be that the reward value may always be one single real value (i.e., a floating point number in most programming languages). On the other hand, since one of the purposes of the method provided in the present disclosure is to build an integrated system, more factors will be considered in such system. One of these factors may be the need for a flexible reward algorithm to reflect different needs of multiple scenarios. For example, there may not be much space in the caching nodes sometimes, so the most important requirement is to consider storage space followed by a requirement for efficiency. In this case, more weights will be given to rewards related to storage space and less weights will be given to rewards related to efficiency.

Moreover, a further feature that emulator 120 for reinforcement learning may need may be a time-step function.

The time-step function can apply action selection and can update the state for the time step, and return the next state of the environment and an immediate reward for the action. If the environment is real, the environment (e.g., the environment code) can make actual changes (e.g., moving a robot arm, etc.) and thus may need to wait for the time step to pass, and can then read the sensor to obtain the next state of the environment and calculate the reward for the action. If the environment is emulated, the environment (e.g., the environment code) can invoke an internal model to calculate the next state of the environment. In some embodiments, the time-step function can invoke proprietary software provided for a task.

It should be further noted that if the actions available in the environment depend on the current state of the environment, the function (e.g., code) for this situation can exist in the environment emulation (e.g., emulated network 140) or in agent 130, or may be some kind of helper functions that agent 130 can invoke, so it can filter the actions before selecting one action. In summary, emulator 120 in FIG. 1 may need to be able to return the state of the environment (e.g., emulated network 140) and the reward value for the action of agent 130, and accept the action selection made by agent 130.

Therefore, in some embodiments, emulator 120 can provide agent 130 with network state representation 122 and content request event 124 of emulated network 140. Network state representation 122 can represent the state of emulated network 140, and content request event 124 can represent an event in which a request node requests a certain piece of target content from a source node. This request event can, for example, be randomly generated. It should be noted that although network state representation 122 and content request event 124 are depicted in FIG. 1 as being provided to agent 130 together, this is only an example and is not intended to limit the scope of the present disclosure in any way. In other embodiments, network state representation 122 and content request event 124 can also be provided to agent 130 separately.

Upon receipt of network state representation 122 and content request event 124, agent 130 can determine a caching strategy or decision to be performed in emulated network 140. For example, which intermediate node(s) between the source node and the request node will cache the target content, and/or which storage area(s) in the caching nodes will cache the target content. Based on the caching decision, agent 130 can provide action information 126 to emulator 120 to indicate a caching action to be performed in emulated network 140. Based on the caching action indicated by action information 126, emulator 120 can perform the caching action in emulated network 140, and perform related performance and parameter measurements during this content delivery, thereby collecting training data 150 for training agent 130. As mentioned above, agent 130 may be implemented by software, hardware, or a combination of both, where the implementation through software may have additional technical advantages, as described below with reference to FIG. 3.

Figure 3:
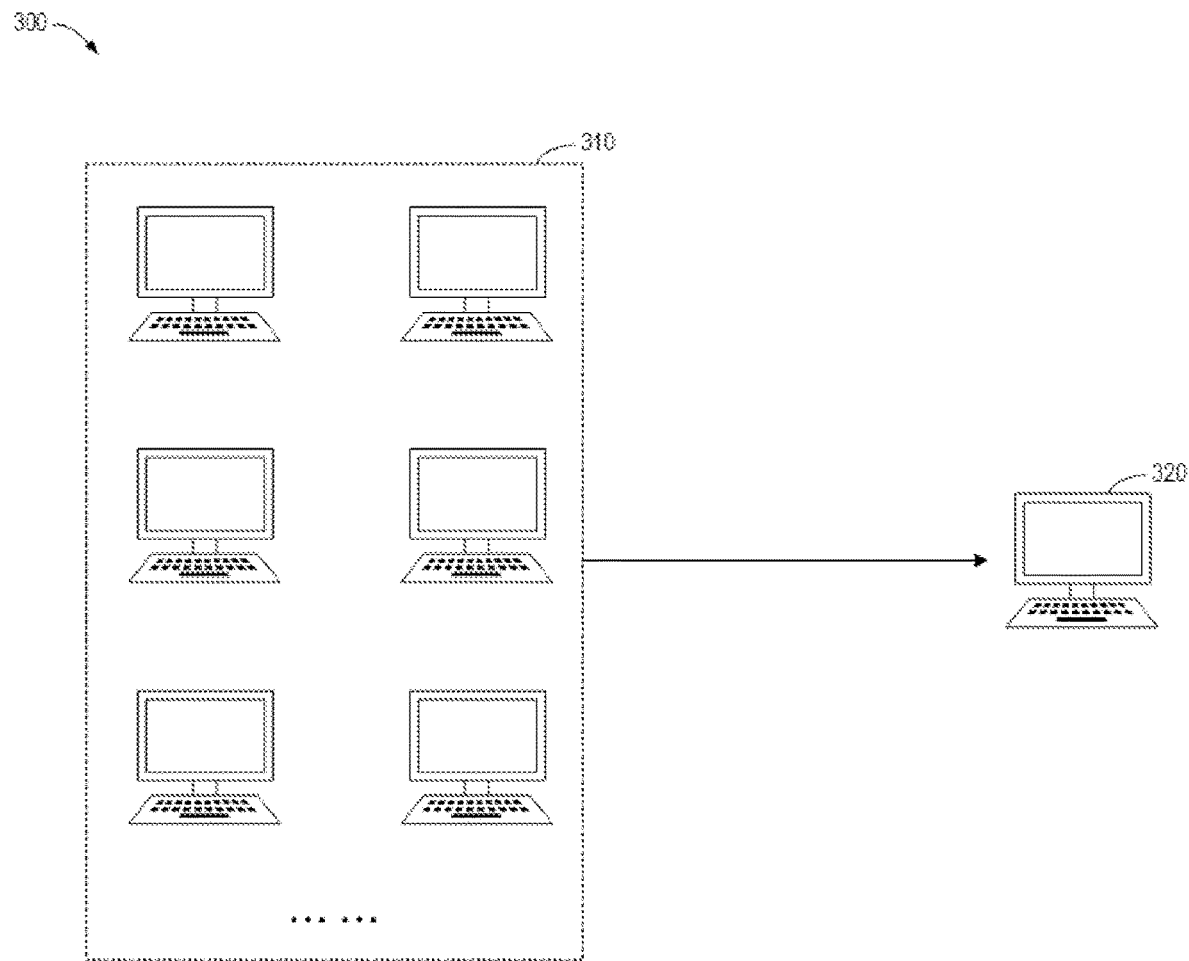
FIG. 3 illustrates an example scenario in which multiple computers (or multiple virtual machines) required by conventional methods can be simplified to one single computing device that is merely required according to embodiments of the present disclosure.

FIG. 3 illustrates example scenario 300 in which multiple computers (or multiple virtual machines) 310 required by conventional methods can be simplified to one single computing device 320 that is merely required according to embodiments of the present disclosure. That is, in example scenario 300 of FIG. 3, emulator 120 depicted in FIG. 1 can be implemented in one single computing device 320. Thus, one single computing device 320 in FIG. 3 can be considered as an example of computing device 110 illustrated in FIG. 1. For example, in such embodiment, emulator 120 can be implemented on a code basis and thus can require only one computer with a code editor. In contrast, conventional methods require multiple computers (or multiple virtual machines) 310 for implementing the same function.

In some embodiments, computing device 110 may include any device capable of implementing computing functions and/or control functions, including but not limited to, a dedicated computer, a general-purpose computer, a general-purpose processor, a micro-processor, a micro-controller, or a state machine. Computing device 110 may be implemented as an individual computing device or a combination of computing devices, for example, a combination of a digital signal processor (DSP) and a micro-processor, multiple micro-processors, one or more micro-processors combined with a DSP core, or any other such configuration. It should also be noted that in the context of the present disclosure, computing device 110 may also be referred to as electronic device 110, and the two terms are used interchangeably herein.

In some embodiments, the communication links between various components in the system involved in the present disclosure may be any form of connection or coupling that enables data communication or control signal communication between these components, including but not limited to, coaxial cable, fiber optic cable, twisted pair, or a wireless technology (such as infrared, radio, and microwave). In some embodiments, the communication links may also include, but are not limited to, network cards, hubs, modems, repeaters, bridges, switches, routers, and other devices for network connection, as well as various network connection lines, wireless links, and the like. In some embodiments, the communication links may include various types of buses. In other embodiments, the communication links may include computer networks, communication networks, or other wired or wireless networks.

It should be understood that FIG. 1 only schematically shows units, elements, modules, or components in information processing environment 100 that are related to the embodiments of the present disclosure. In practice, information processing environment 100 may also include other units, elements, modules, or components for other functions. In addition, the particular numbers of units, elements, modules, or components shown in FIG. 1 are only illustrative, and are not intended to limit the scope of the present disclosure in any way. In other embodiments, information processing environment 100 may include any appropriate numbers of computing devices and related elements. Therefore, the embodiments of the present disclosure are not limited to the specific scenario depicted in FIG. 1, but are generally applicable to any technical environment for information processing.

Figure 4:
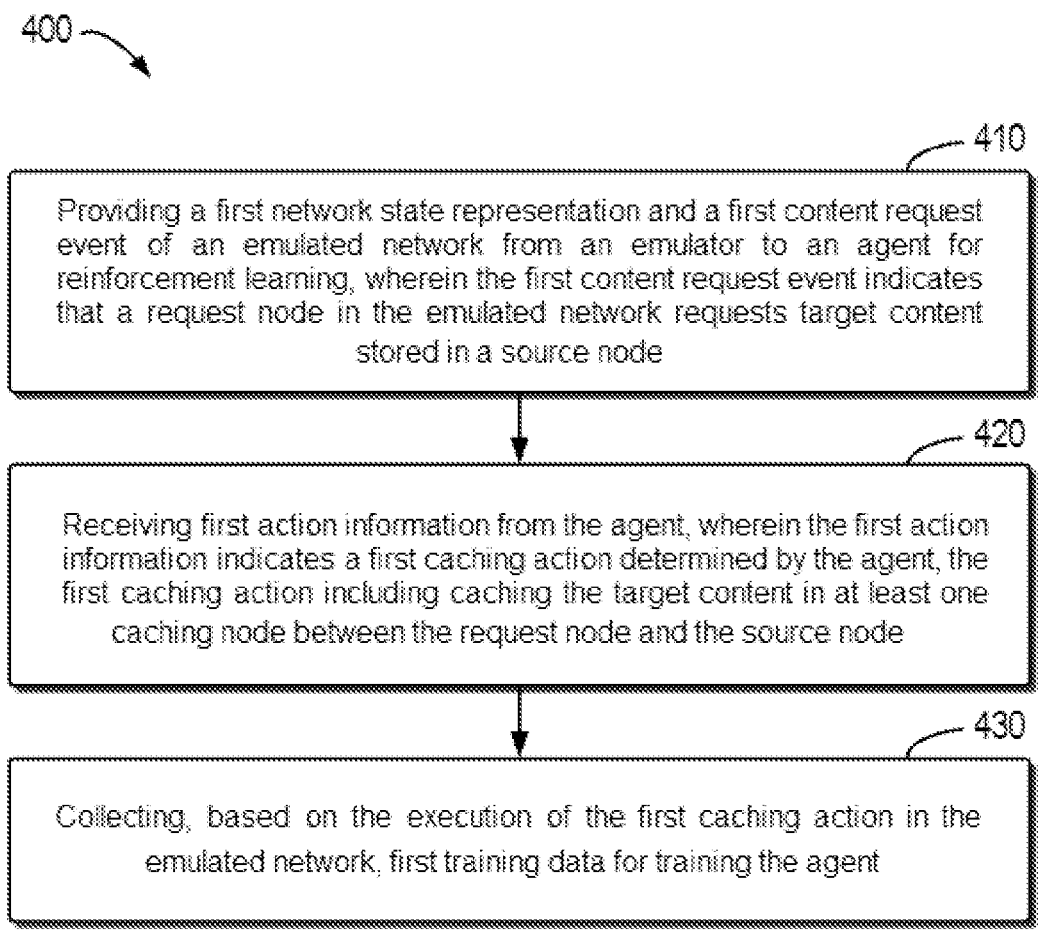
FIG. 4 illustrates a flow chart of an example information processing method according to embodiments of the present disclosure.

FIG. 4 illustrates a flow chart of example information processing method 400 according to embodiments of the present disclosure. In some embodiments, method 400 can be implemented by emulator 120 in computing device 110 in environment 100. For example, it may be implemented by a processor or processing unit for implementing emulator 120 in computing device 110, or by various functional modules for implementing emulator 120 in computing device 110. In other embodiments, method 400 can also be implemented by an emulator in a computing device independent of environment 100, or may be implemented by other units or modules for implementing an emulator in environment 100. For ease of discussion, method 400 will be described in conjunction with FIG. 5.

Figure 5:
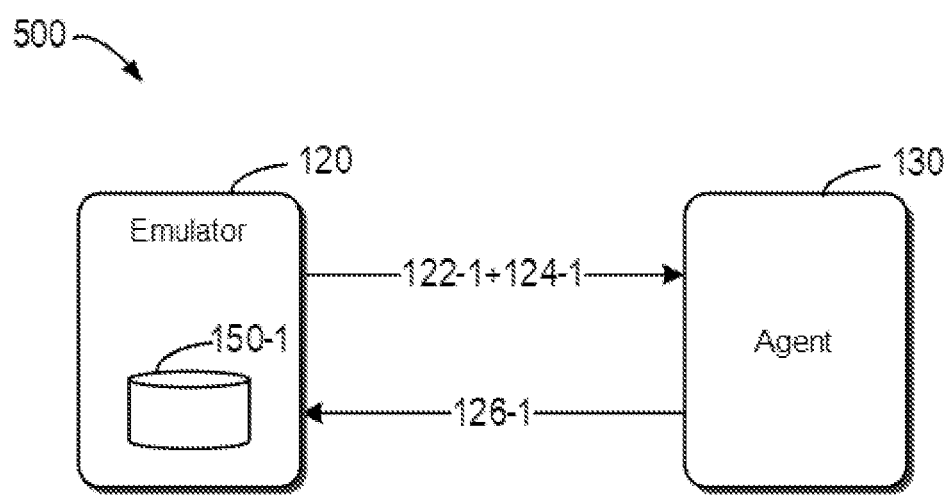
FIG. 5 illustrates a schematic diagram of a first loop between an emulator and an agent according to embodiments of the present disclosure.

FIG. 5 illustrates a schematic diagram of first loop 500 between emulator 120 and agent 130 according to embodiments of the present disclosure. It should be noted that the scenario illustrated in FIG. 5 can be considered as an example portion of the process of interaction between emulator 120 and agent 130 depicted in FIG. 1. For example, the process of interaction between emulator 120 and agent 130 may include multiple loops, each of which may refer to a loop in which emulator 120 sends one network state representation 122 and one content request event 124 of emulated network 140 to agent 130, then agent 130 sends one instance of action information 126 to emulator 120, and then emulator 120 performs in emulated network 140 one caching action specified by agent 130 and collects training data 150 once.

In some embodiments, first loop 500 illustrated in FIG. 5 may be any one of the multiple loops during the process of interaction between emulator 120 and agent 130. In other words, first loop 500 is not necessarily the first loop between emulator 120 and agent 130, that is, there may be another loop before first loop 500. Of course, in other embodiments, first loop 500 may also be the first loop between emulator 120 and agent 130. That is, there is no other loop before first loop 500. In this scenario, emulator 120 and agent 130 may be initialized and ready to begin the process of interaction for training agent 130.

Referring to FIGS. 4 and 5, at block 410 of FIG. 4, emulator 120 provides first network state representation 122-1 and first content request event 124-1 of emulated network 140 to agent 130 for reinforcement learning. It should be noted that although first network state representation 122-1 and first content request event 124-1 are depicted in FIG. 5 as being sent simultaneously from emulator 120 to agent 130, this is merely schematic and is not intended to limit the scope of the present disclosure in any way. In other embodiments, emulator 120 can also provide first network state representation 122-1 and first content request event 124-1 separately to agent 130.

In some embodiments, first network state representation 122-1 may include a network topology of emulated network 140 and node characteristics of nodes in emulated network 140. In this manner, emulator 120 can provide agent 130 with necessary information about emulated network 140 and its nodes, so that agent 130 can be trained based on the rich information to have the ability to make more optimized caching decisions. For example, the network topology in first network state representation 122-1 will affect the path of transmission of content among nodes and thus will affect the caching decisions of agent 130. In some embodiments, the topology (e.g., the original topology) of emulated network 140 may be constructed based on a Fast Network Simulation Setup (FNSS) tool chain. In this manner, the FNSS tool chain can return an adjacency matrix and a node matrix related to various nodes in emulated network 140, which can describe the topology of the network graph almost perfectly.

Further, in some embodiments, the node characteristics in first network state representation 122-1 may include node types such that agent 130 may be trained based on the types of various nodes to make more optimized caching decisions. For example, if emulated network 140 is an information-centric network, there may typically be three types of nodes in emulated network 140, i.e., source nodes, caching nodes, and request nodes (which may also be referred to as target nodes in an ICN). In the node definition for an ICN, the source node may be a node that stores content, the target node may be a node that requests content, and the caching node may be a special target node having an ability to cache content. Additionally or alternatively, the node characteristic in first network state representation 122-1 may include the cache state of a node. For example, whether there is content cached in the node, or an identifier of content cached in the node, and so on. Based on the cache state information, agent 130 can be trained based on the cache state of each node to make more optimized caching decisions.

Additionally or alternatively, the node characteristic in first network state representation 122-1 may include content characteristics of content in a node, such that agent 130 can be trained based on the characteristics of various pieces of content in various nodes to make more optimized caching decisions. In some embodiments, the content characteristics may include the frequency of requests for the content, which may indicate whether the content is requested frequently. For example, when selecting content to be replaced, agent 130 may preferentially replace content with low request frequency. In other embodiments, the content characteristics may include the time when content was cached, which may indicate how new or old the cached content is. For example, when selecting content to be replaced, agent 130 may preferentially replace the content that is cached earlier.

In other embodiments, the content characteristics may include the recent popularity (which may also be referred to as popular degree herein) of content, which may be determined based on the frequency of requests for the content and the time when the content was last requested. Because the recent popularity comprehensively takes into account the frequency at which the content was requested and whether the content was requested recently, it can be a better representation of the current popular degree of the content. For example, when selecting the content to be replaced, if there are two pieces of content available to be replaced, and the frequencies of accesses to these two pieces of content are the same or not very different, agent 130 may preferentially replace the content that was requested earlier last time. With these content characteristics described above, agent 130 can better determine whether a certain piece of content can be replaced by new content that needs to be cached, and thus be better trained to make more optimized caching decisions.

Still referring to FIG. 5, first content request event 124-1 can represent an event in which the request node in emulated network 140 requests target content stored in the source node. As mentioned above, in some embodiments, first content request event 124-1 can be randomly generated. This is reasonable because, in a real network, request events occurring in the network can also be considered as a random process. Thus, based on first content request event 124-1, agent 130 can be trained, based on the nodes and content characteristics involved in the request event, to make more optimized caching decisions.

Still referring to FIGS. 4 and 5, at block 420 of FIG. 4, emulator 120 receives first action information 126-1 from agent 130. First action information 126-1 can indicate a first caching action determined by agent 130. For example, in which intermediate node(s) the target content in first content request event 124-1 is to be cached. For another example, in which storage area(s) of the node the target content is to be cached. As an example, after receiving first network state representation 122-1 and first content request event 124-1 from emulator 120, agent 130 can learn the topology of emulated network 140, the request node, the source node, and the requested target content, so that the path of transmission of the target content from the source node to the request node can be determined. In some embodiments, if there are multiple alternative transmission paths, agent 130 can select a preferred transmission path from these transmission paths to optimize the transmission performance of the target content.

After determining the transmission path for the target content, agent 130 can further determine the intermediate nodes through which the target content between the request node and the source node will pass. Next, based on various kinds of information in first network state representation 122-1 such as network topology information and node characteristics information, agent 130 can use a reinforcement learning model to make caching decisions related to the target content. In general, the caching decision made by agent 130 can be any content that needs to be decided in relation to the caching of the target content. Thus, in the context of the present disclosure, a "caching decision" can also be referred to as a "caching action." As mentioned above, in some embodiments, such caching action may include which intermediate node(s) need(s) to execute an operation of caching the target content. Therefore, the first caching action may include caching the target content in one or more caching nodes between the request node and the source node. After determining the caching action associated with the target content, agent 130 can provide emulator 120 with first action information 126-1 that indicates the first caching action determined by agent 130.

In some embodiments, the first caching action indicated by first action information 126-1 can be selected from a first set of actions. The first set of actions can be represented using a first set of bits, wherein the number of bits in the first set of bits is equal to the number of nodes of emulated network 140, and each bit can indicate whether the corresponding node will cache the target content. Each node corresponds to one bit, and the value of this bit indicates whether this node is to cache the target content. In this manner, which node the target content will be cached in can be efficiently expressed by means of a bitmap, thus improving the efficiency of action representation. In some embodiments, if agent 130 is designed for entire emulated network 140, the number of actions in the first set of actions may depend on the number of nodes in emulated network 140. For example, in the case where the number of nodes is n, the number of actions in the first set of actions can be $2^n$. In this way, in a case where multiple agents are provided, information interaction between the multiple agents can be excluded, thus saving relevant resources. In some embodiments, if agent 130 is designed for one node in emulated network 140, the first set of actions may include two actions, i.e., caching and not caching. In this way, the design of agent 130 can be simplified.

In other embodiments, the caching action indicated by agent 130 to emulator 120 may further include identification of which storage area should be used to cache the target content in a certain caching node that needs to cache the target content. In a case where the storage space of the caching node is full, the caching action illustratively identifies which existing piece of content in the caching node should be replaced by the target content. In this manner, agent 130 can indicate, with a simple action representation, the specific storage area where the target content is to be stored or the content that is to be replaced. Thus, in some embodiments, the first caching action indicated by first action information 126-1 can be selected from a second set of actions. An action in the second set of actions can indicate caching the target content in a target storage area in the caching node. In some embodiments, if agent 130 is designed for entire emulated network 140, the number of actions in the second set of actions may depend on the number of nodes in emulated network 140 and the number of storage areas in the node. In this way, in a case where multiple agents are provided, information interaction between the multiple agents can be excluded, thus saving relevant resources. For example, when the node has k storage areas and emulated network 140 includes n nodes, this number of actions may be $n^k$. In some embodiments, if agent 130 corresponds to one node in emulated network 140, the number of actions in the second set of actions may depend on the number of storage areas of the node. In this way, the design of agent 130 can be simplified. For example, when the caching node has k storage areas, the number of actions may be k.

Still referring to FIGS. 4 and 5, at block 430 of FIG. 4, emulator 120 collects, based on the execution of the first caching action determined by agent 130 in emulated network 140, first training data 150-1 for training agent 130. In general, first training data 150-1 may include any data that can implement training of agent 130. In some embodiments, first training data 150-1 may include data that is more conducive to the training of agent 130, for example, first network state representation 122-1, first action information 126-1, and/or a reward value for the first caching action, and the like. In this way, emulator 120 can collect relevant data that is more conducive to training of agent 130, and thus can better implement the training of agent 130. In some embodiments, the reward value can be determined based on a reward function of emulator 120, wherein the reward function may be based on a hit rate of the cached content, an average latency of the requested content, and/or a bandwidth occupied by transmitting the requested content, among others. In this manner, agent 130 can be trained to make caching decisions that will cause these parameters to be optimized, thereby improving content caching and transmission performance in emulated network 140. In some embodiments, the hit rate, average latency, and bandwidth described above may each have an adjustable weight in the reward function. Therefore, the importance of each parameter in training, and also the importance of these parameters in providing caching decisions by trained agent 130, can be flexibly adjusted.

In some embodiments, emulator 120 can perform the first caching action indicated by agent 130 in emulated network 140 based on a time step to be determined by the time-step function of emulator 120. As noted above, the time-step function can apply action selection and can update the state for the time step and determine the next state of emulated network 140 and an immediate reward for the first caching action. In this manner, emulator 120 can better control or manage the process of interaction with agent 130 with respect to time.

In some embodiments, if emulator 120 collects first training data 150-1, emulator 120 can store first training data 150-1 rather than immediately providing first training data 150-1 to agent 130. In this way, emulator 120 can accumulate training data 150 in batches, thereby reducing the amount of computation of both emulator 120 and agent 130, and also saving related occupied quantities of resources. In addition, after first training data 150-1 is stored, emulator 120 can also perform preprocessing on first training data 150-1, for example, handling useless data (such as nulls or outliers) in first training data 150-1, performing normalization or data scaling, feature encoding, discretizing on first training data 150-1, and so on. In this manner, the effect of training on agent 130 based on first training data 150-1 can be optimized. Of course, in other embodiments, if emulator 120 collects first training data 150-1, emulator 120 can also provide first training data 150-1 to agent 130 immediately. In this way, it is possible to save storage resources for storing first training data 150-1.

Under normal circumstances, in order to sufficiently train agent 130, it may not be sufficient to perform only one loop 500 between emulator 120 and agent 130. Therefore, in some embodiments, a second loop can be continued between emulator 120 and agent 130 after first loop 500 is concluded. In other words, emulator 120 can send another network state representation 122 and another content request event 124 of emulated network 140 to agent 130, then agent 130 can send another instance of action information 126 to emulator 120, and then emulator 120 can perform in emulated network 140 another caching action specified by agent 130, and can collect training data 150 once again. In this manner, emulator 120 can train agent 130 more sufficiently. Such embodiment will be described below with reference to FIGS. 6 and 7.

Figure 6:
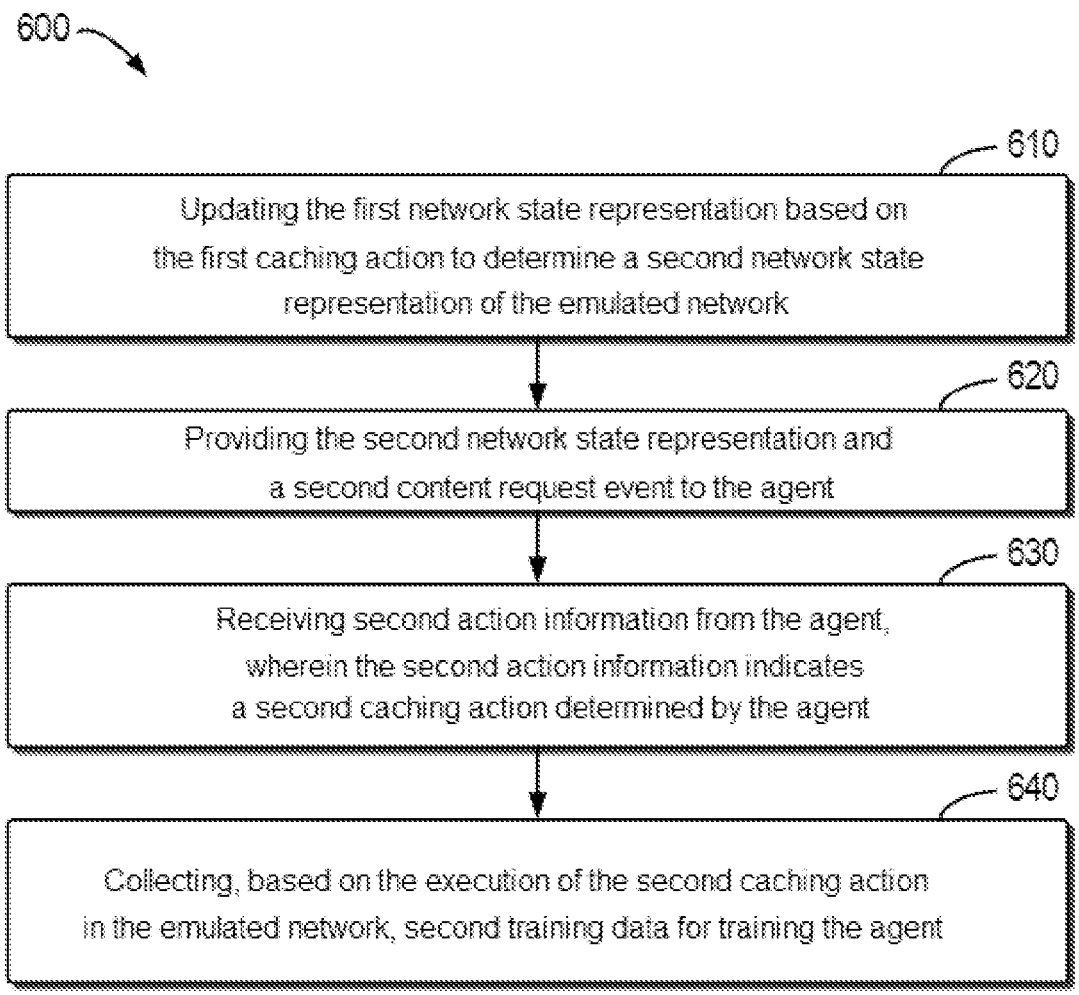
FIG. 6 illustrates a flow chart of an example process of performing a second loop between an emulator and an agent according to embodiments of the present disclosure.

FIG. 6 illustrates a flow chart of example process 600 of performing a second loop between emulator 120 and agent 130 according to embodiments of the present disclosure. In some embodiments, process 600 can be implemented by emulator 120 in computing device 110 in environment 100. For example, it can be implemented by a processor or processing unit for implementing emulator 120 in computing device 110, or by various functional modules for implementing emulator 120 in computing device 110. In other embodiments, process 600 can also be implemented by an emulator in a computing device independent of environment 100, or can be implemented by other units or modules for implementing an emulator in environment 100. For ease of discussion, process 600 will be described in conjunction with FIG. 7.

Figure 7:
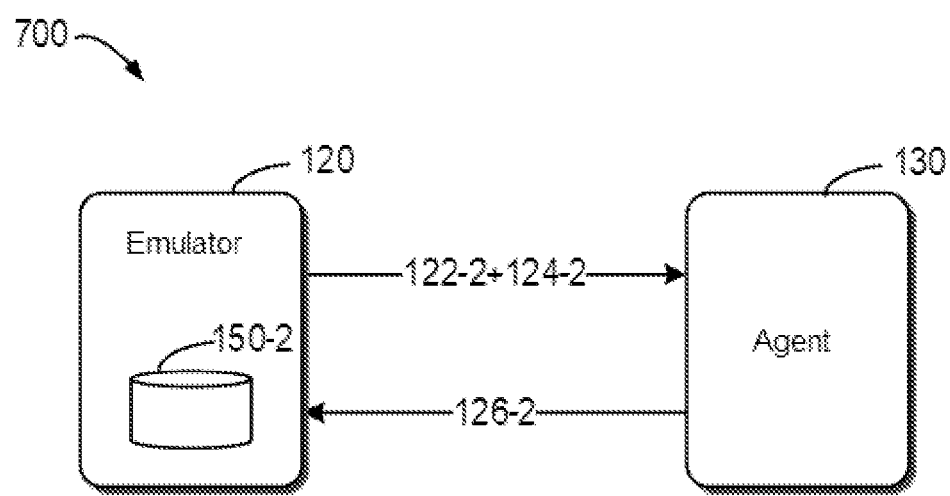
FIG. 7 illustrates a schematic diagram of a second loop between an emulator and an agent according to embodiments of the present disclosure.

FIG. 7 illustrates a schematic diagram of second loop 700 between emulator 120 and agent 130 according to embodiments of the present disclosure. It should be noted that the scenario illustrated in FIG. 7 can be considered as an example portion of the process of interaction between emulator 120 and agent 130 depicted in FIG. 1. For example, the process of interaction between emulator 120 and agent 130 may include multiple loops, and second loop 700 may be a loop that takes place after first loop 500 depicted in FIG. 5.

Referring to FIGS. 6 and 7, at block 610 of FIG. 6, emulator 120 can update first network state representation 122-1 based on the first caching action provided by agent 130 in first loop 500 to determine second network state representation 122-2 of emulated network 140. In other words, emulator 120 performs, in emulated network 140, the first caching action performed by first action information 126-1 provided by agent 130 as depicted in FIG. 5. For example, in accordance with first action information 126-1 provided by agent 130, emulator 120 caches the target content into one or more intermediate nodes. For another example, when targeting a specific node, emulator 120 caches the target content into a specific storage area specified in first action information 126-1, and so on. After completing the caching action, emulator 120 can determine second network state representation 122-2.

At block 620, emulator 120 can provide second network state representation 122-2 and second content request event 124-2 to agent 130. For example, second network state representation 122-2 and second content request event 124-2 may be similar to first network state representation 122-1 and first content request event 124-1, respectively. Therefore, the specific content and related processes of second network state representation 122-2 and second content request event 124-2 will not be repeated here. Of course, it should be noted that since content request event 124 can be randomly generated, second content request event 124-2 is generally different from first content request event 124-1, but the two may also be the same.

At block 630, emulator 120 can receive second action information 126-2 from agent 130, wherein second action information 126-2 indicates a second caching action determined by agent 130. For example, second action information 126-2 and the second caching action may be similar to first action information 126-1 and the first caching action, respectively. Therefore, the specific content and related processes of second action information 126-2 and the second caching action will not be repeated here.

At block 640, emulator 120 can collect, based on the execution of the second caching action in emulated network 140, second training data 150-2 for training agent 130. For example, the process in which emulator 120 performs the second caching action may be similar to that in which emulator 120 performs the first caching action, and the process in which emulator 120 collects second training data 150-2 may be similar to that in which emulator 120 collects first training data 150-1. In addition, the content of second training data 150-2 may be similar to that of first training data 150-1. Further, similar to that for first training data 150-1, emulator 120 can store and preprocess second training data 150-2. In addition, emulator 120 can also similarly perform the second caching action based on a time step determined by a time-step function. Thus, the process in which emulator 120 performs the second caching action to collect second training data 150-2 will not be repeated here.

Figure 8:
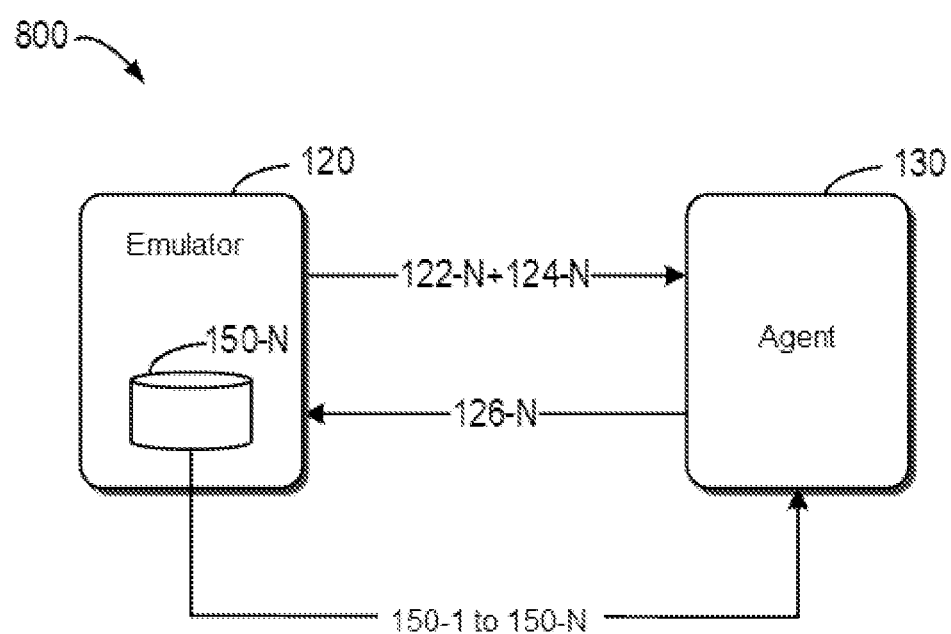
FIG. 8 illustrates a schematic diagram of an Nth loop between an emulator and an agent according to embodiments of the present disclosure.

FIG. 8 illustrates a schematic diagram of Nth loop 800 between emulator 120 and agent 130 according to embodiments of the present disclosure. It should be noted that the scenario illustrated in FIG. 8 can be considered as an example portion of the process of interaction between emulator 120 and agent 130 depicted in FIG. 1. For example, the process of interaction between emulator 120 and agent 130 may include multiple loops, and Nth loop 800 may be considered as the last loop in a training epoch or a training phase.

Referring to FIG. 8, similar to that described with respect to FIGS. 6 and 7, emulator 120 can update the (N−1)th network state representation based on the Nth caching action to determine Nth network state representation 122-N of emulated network 140. Emulator 120 can then provide Nth network state representation 122-N and Nth content request event 124-N to agent 130. Next, emulator 120 can receive Nth action information 126-N from agent 130, wherein Nth action information 126-N indicates the Nth caching action determined by agent 130. Thereafter, emulator 120 can collect, based on the execution of the Nth caching action in emulated network 140, Nth training data 150-N for training agent 130.

It should be noted that Nth network state representation 122-N, Nth content request event 124-N, Nth action information 126-N, Nth training data 150-N, etc., involved in Nth loop 800 may be similar to first network state representation 122-1, first content request event 124-1, first action information 126-1, first training data 150-1, etc., involved in first loop 500, respectively, or may be similar to second network state representation 122-2, second content request event 124-2, second action information 126-2, second training data 150-2, etc., involved in second loop 700, respectively. In addition, the content of Nth training data 150-N may be similar to that of first training data 150-1 and that of second training data 150-2. Further, similar to that for first training data 150-1 or second training data 150-2, emulator 120 can store and preprocess Nth training data 150-N. In addition, emulator 120 can also similarly perform the Nth caching action based on a time step determined by a time-step function. Thus, the content or related processes of Nth network state representation 122-N, Nth content request event 124-N, Nth action information 126-N, and Nth training data 150-N will not be repeated here.

In some embodiments, if the number of collected pieces of training data 150 reaches a predetermined number N, emulator 120 can provide the predetermined number N of collected pieces of training data 150 (e.g., including training data 150-1 to 150-N) together to agent 130. In this way, the number of loops in a training phase or training epoch can be flexibly set by a user manually. In such embodiment, emulator 120 can perform preprocessing on training data 150-1 to 150-N collectively instead of performing preprocessing on training data 150-1 to 150-N separately with respect to time, thereby simplifying the preprocessing operations by emulator 120 on training data 150.

As mentioned above, in some embodiments, first loop 500 illustrated in FIG. 5 may be the first loop between emulator 120 and agent 130. That is, there is no other loop before first loop 500. For example, emulator 120 and agent 130 may be completely initialized and be ready to begin the process of interaction for training agent 130. In such an embodiment, the initialization of emulator 120 may include determining first network state representation 122-1 and first content request event 124-1 of emulated network 140, and the aforementioned predetermined number N. In other words, when emulator 120 is being initialized, emulator 120 can determine how many loops after which training data 150 is collectively provided to agent 130. Through initialization of emulator 120, various emulation parameters of emulator 120 can be configured according to the needs of the training of agent 130, thereby optimizing the training of agent 130.

Some embodiments of emulator 120 of the present disclosure and its process of interaction with agent 130 have been described above with reference to FIGS. 1 to 8. In addition, the technical advantages and benefits that emulator 120 may have over conventional solutions are briefly noted above for various embodiments. In addition to the advantages noted above, a possible novelty or improvement of emulator 120 of the present disclosure is that emulator 120 may be a completely new code-based network cache RL emulator. For example, it may be entirely based on the Python language. Conventionally, people always deploy many virtual machines or even many real computers to emulate a network (e.g., an ICN), embodiments of the present disclosure provide a simple alternative method, in which, for those who wants to do some experiments on the network (e.g., an ICN), one computer and a code editor such as VS code are all that is needed, which is convenient and time-saving.

Secondly, the improvement may be that emulator 120 is an emulator for training RL that can interact with an RL agent. Specifically, the reward and state information needed in RL training are returned as inputs to a neural network in the RL agent. In addition, emulator 120 is designed to accept action information from the RL agent. Thus, emulator 120 can be used for caching strategies of any RL algorithm. A further improvement may lie in the content representation of content in the network. In most conventional emulators (e.g., Icarus emulators), the content is represented by numbers only. That is, in a caching system, the attributes (which may not be unimportant in the caching system) of the content will be ignored. The embodiments of the present disclosure provide a new content representation form to encode content attributes. The embodiments of the present disclosure also provide a corresponding RL training process, including a new result collection approach. In addition, specific RL algorithms have been tested on emulator 120 and the test results are very good.

It should be noted that although emulator 120 of embodiments of the present disclosure may be entirely software-based, in other embodiments, emulator 120 of embodiments of the present disclosure may also be implemented based on hardware, or a combination of both software and hardware. In addition, in some embodiments, emulator 120 may also be implemented based on an adaptation of a conventional emulator to save resources used to develop emulator 120 of embodiments of the present disclosure. For example, a conventional emulator that can be used for adaptation may be an emulator called Icarus. In other words, as an example embodiment, emulator 120 of embodiments of the present disclosure can be implemented by improving an Icarus emulator. Such implementation will be described below with reference to FIGS. 9 to 11.

Figure 9:
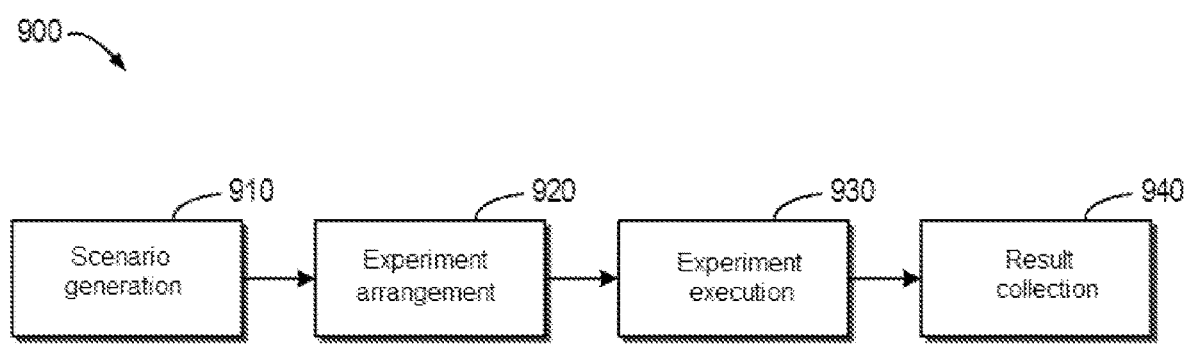
FIG. 9 illustrates a workflow of a conventional emulator for evaluating the cache performance in an ICN.

FIG. 9 illustrates workflow 900 of a conventional emulator for evaluating the cache performance of an ICN. For example, FIG. 9 depicts related phases of a conventional Icarus emulator. As an ICN emulator, Icarus is a Python-based discrete-event emulator for evaluating the cache performance in an ICN. Icarus can be unconstrained by any specific ICN architecture and is designed to cause users to implement and evaluate new caching strategies or caching and routing strategies with few lines of code.

As shown in FIG. 9, workflow 900 of the Icarus emulator may include scenario generation 910, experiment arrangement 920, experiment execution 930, and result collection 940. The phase of scenario generation 910 includes all the steps required to set up a fully configured network topology and a random event generator for emulation. For example, scenario generation 910 may be based on the FNSS tool chain. In the phase of experiment arrangement 920, the Icarus emulator can read from a configuration file the range of parameters (e.g., cache size, caching strategy, content popular degree distribution, etc.) that a user wishes to emulate, and perform the experiment using all the required combinations of parameters. The Icarus emulator can then be arranged to execute experiments in parallel in a set of processes.

The phase of experiment execution 930 includes the actual execution of the experiment. An instance of the Icarus emulation engine is provided with a scenario description (i.e., a network topology and an event generator). The engine reads an event from the generator and distributes it to relevant handlers. One or more data collectors will measure various user-specified metrics and return the results to the engine at the end of the experiment, and the engine then passes them to a result aggregator. Regarding the phases of result collection 940 and analysis, the object will collect the results and aggregate them after each time an experiment is terminated, and allow the user to calculate a confidence interval, plot the results, or serialize data in various formats for subsequent processing. However, the Icarus emulator cannot be used for reinforcement learning scenarios, and many improvements for RL training are required if the Icarus emulator is to be used in the reinforcement learning settings, and the required improvements will be discussed specifically below.

Conventionally, people prefer to use real computers or virtual machines to train and evaluate an RL agent, but this is neither convenient nor efficient. Therefore, an entirely code-based emulator is needed to free up the effort of building an emulated environment. The Icarus emulator may meet some of the requirements of an RL emulator, but the Icarus emulator is still far from being applied to RL training, and many improvements and work are needed. The first improvement required is to use code to emulate the caching process. Although it was fortunate to find a baseline for a code-based emulator that could address this issue to some extent, it was still an initial problem that people encounter at the beginning.

The next improvement required is the emulator adaptation problem. As mentioned earlier, the current Icarus emulator requires many modifications to become an RL emulator. For example, content is currently represented with pure numbers in the Icarus emulator, but the attributes of the content are also important in the training and testing of caching strategies. The improvement then required is the design of the RL emulator. How to design a scalable and flexible RL emulator is another issue. The reward and state system should be designed and easily modified for use in different RL settings, and it is also needed to accept different forms of actions and execute actions based on the input. A further improvement required is an RL training framework for the RL caching emulator. Due to the characteristics of the Icarus emulator, a specific RL training framework should be designed to perform the entire training process, and the data stream needs to be carefully designed and processed to perform RL training.

Figure 10:
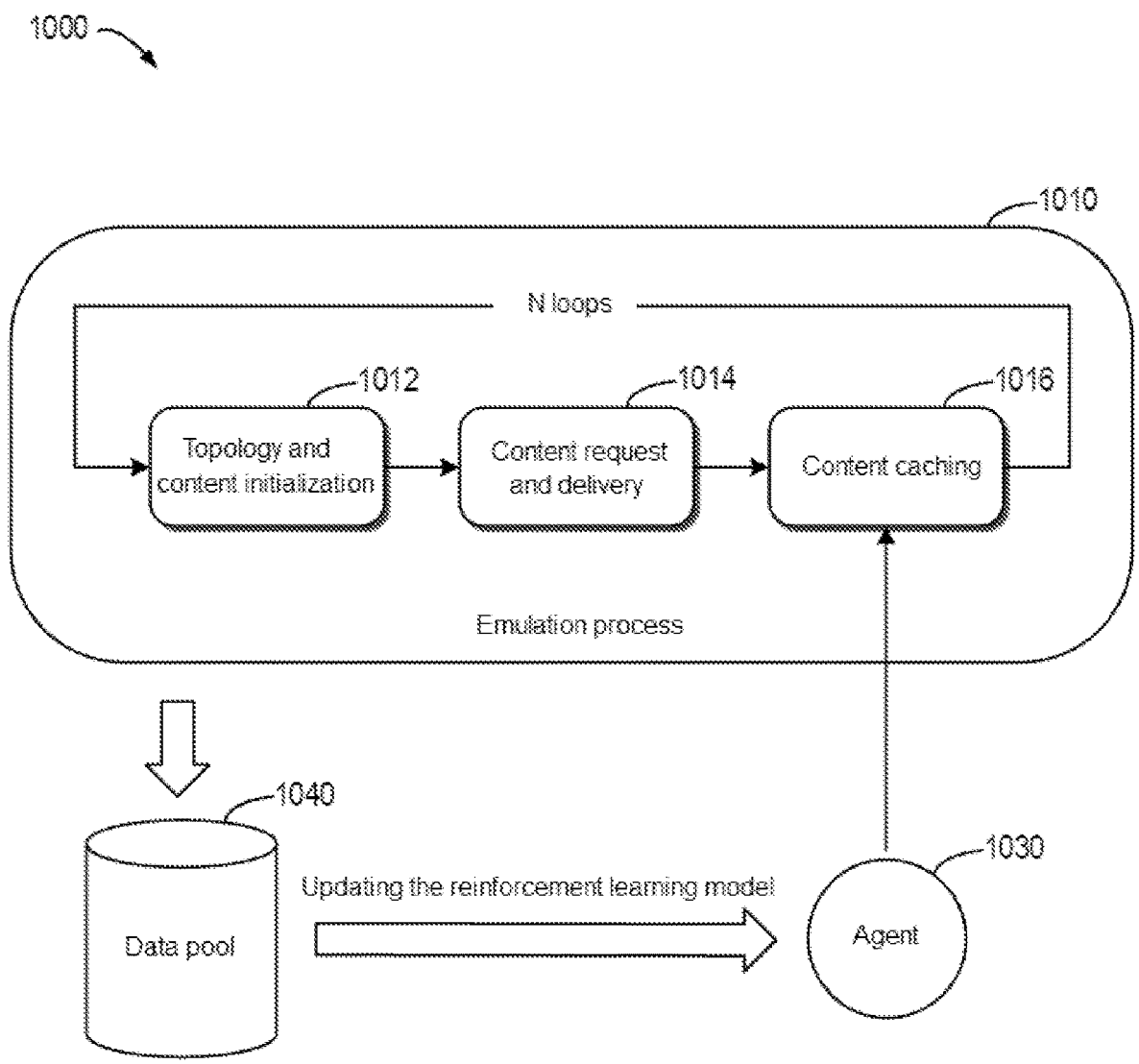
FIG. 10 illustrates the architecture of a workflow of an emulator of embodiments of the present disclosure that is implemented by improving a conventional emulator.

FIG. 10 illustrates the architecture of workflow 1000 of emulator 1010 of embodiments of the present disclosure that is implemented by improving a conventional emulator. It should be noted that emulator 1010 depicted in FIG. 10 may be considered as an example or embodiment of emulator 120 in FIG. 1. In order to provide emulator 1010 for RL caching algorithms, such as a purely code-based emulator, in the present disclosure, the workflow of emulator 1010 is first designed, some parts (e.g., the emulation process) of which can be adapted from the Icarus emulator. Then, in the present disclosure, the output (states and rewards) and input (actions) of the system are designed, and finally, a detailed training framework is presented to train an agent on the RL emulator.

In workflow 1000, emulator 1010 can perform topology and content initialization 1012, content request and delivery 1014, and content caching 1016, respectively. Agent 1030 (which may be an example of agent 130 of FIG. 1) can indicate to emulator 1010 how to perform content caching 1016. After completing each loop, emulator 1010 can store the training data into data pool 1040. After completing N loops, the training data stored in data pool 1040 can be provided to agent 1030 for training agent 1030, for example, to update the reinforcement learning model of agent 1030.

During the emulation, although the Icarus emulator does a good job of emulating the ICN content delivery and caching process, some details are ignored. Among these details, the content representation is the most important. Content attributes are also very important when deciding the caching strategy. However, in the Icarus emulator, content is represented with pure numbers (content ID), and a lot of information will be lost during training. Thus, embodiments of the present disclosure also store such content attributes, for example, in a Python dictionary. Specifically, the attributes added to the content dictionary may include the frequency of requests, the caching time, the popular degree, among others. The frequency of requests can be defined as pairs (time, request source) stored after counting the number of requests for each piece of content over a period of time (e.g., 1000 requests). The caching time refers to the time when each piece of content was cached, which can also be recorded in the dictionary. The popular degree is calculated based on the frequency of requests and the last request time, and the final value is used to indicate the popular degree of a node or one piece of content.

Regarding the input and return values of emulator 1010, after the emulation part is completed, it is necessary to adapt emulator 1010 to become an RL emulator. Regarding the state representation, since the topology of an ICN does affect caching decisions, the state may include two parts: topology structure and node characteristics. The original topology can be constructed based on the FNSS, and the FNSS can return an adjacency matrix and a node matrix that can perfectly describe the topology of the graph. The node characteristic may include a node type, a cache state, and content attributes. The node type can refer to three types of nodes in an ICN. The source node is a node that stores content, the target node is a node that requests content, and the caching node is a special target node having an ability to cache content. The cache state can refer to the content ID cached in each node and returned by the emulator. Emulator 1010 will return the current delivered content attributes and caching node state.

In addition, the reward function can be a weighted sum of parameters such as a byte hit rate, an average latency, and a bandwidth. The user can easily modify the weights of these parameters in code and can design them as required. Table 1 below illustrates an example of a reward function, wherein this example assumes that the user cares most about latency time, and can then set it with a weight of 15, which can be the largest among the maximum three weights.

TABLE 1

Example of reward function

| Type | Weight |
|---|---|
| Byte hit rate | 3 |
| Average latency | 15 |
| Bandwidth | 5 |

In addition, with respect to the action input to emulator 1010, emulator 1010 can accept a binary vector of which the dimension is the number of nodes. Each element in this vector may represent a caching selection for each node. In the phase of content delivery, if a node is chosen to be used as an agent to train the model, there are only 2 operations (caching or not), and if the agent is an entire network having n nodes, there are $2^n$ possible operations to determine the node for caching. For example, if there are 2 nodes in this network, a possible action is 10, which means that node 1 is chosen to cache this content and that node 0 is not used this time.

In the phase of content replacement, if a node with k MB of storage space is chosen to be used as the agent to train the model, then there are $2^k$ possible operations that may be taken. For example, if k is 2, a possible operation is 10, which means that the first MB is used to cache this content and the last MB is not used. If the agent is an entire network having n nodes, and each node has k MB of space, then there are $n^k$ possible operations. For example, if k is 2 and n is 2, a possible operation would be 10 (the caching situation for node 1) 01 (the caching situation for node 2), and the meaning of the cache situation of each node would be the same as that in the previous example.

Figure 11:
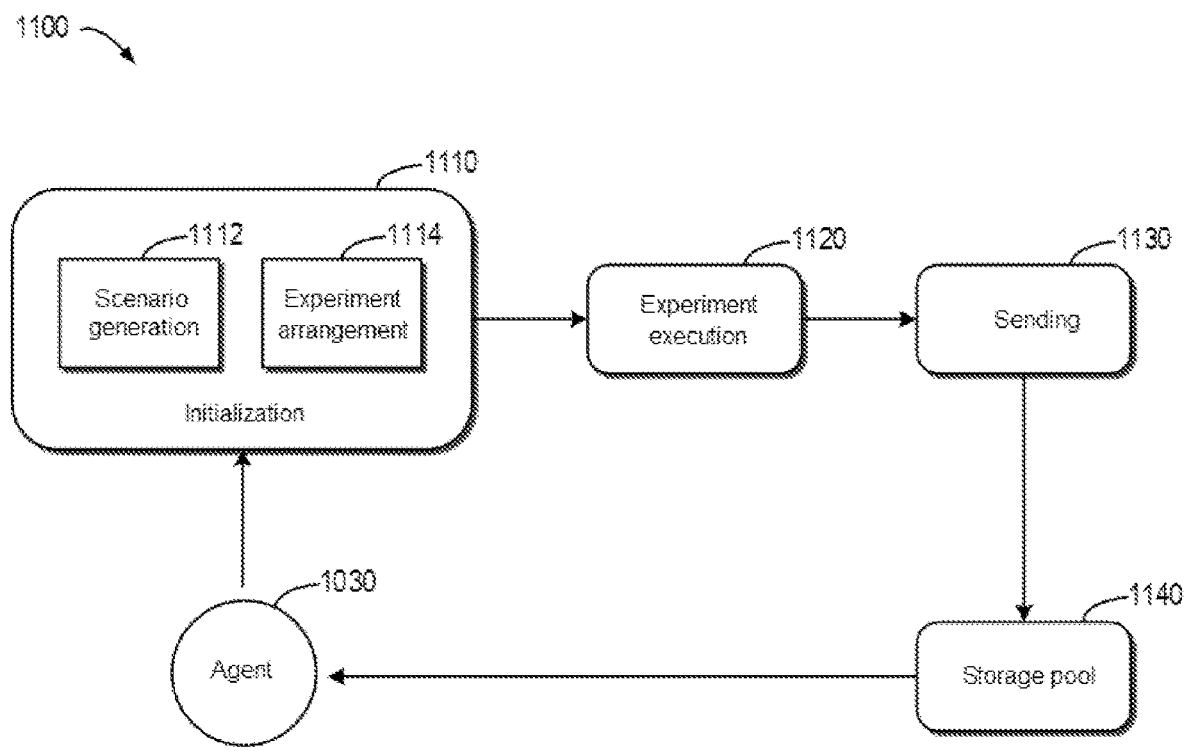
FIG. 11 illustrates a workflow of training an agent by an emulator of embodiments of the present disclosure that is implemented by improving a conventional emulator.

FIG. 11 illustrates workflow 1100 of training agent 1030 by emulator 1010 of embodiments of the present disclosure that is implemented by improving a conventional emulator. As shown in FIG. 11, since the conventional Icarus emulator was not originally designed for reinforcement learning training, the relevant experimental workflow should also be changed to be used for reinforcement learning training. The workflow 1100 can be divided into 4 parts (modules), namely, initialization part 1110, experiment execution part 1120, sending part 1130, and an additional part of storage in storage pool 1140. Initialization part 1110 may further include scenario generation 1112 and experiment arrangement 1114. It will be understood that storage pool 1140 depicted in FIG. 11 may be an example of data pool 1040 in FIG. 10. Specifically, in workflow 1100, emulator 1010 is first initialized. It is worth noting that scenario generation 1112 and experiment arrangement 1114 in workflow 1100 differ from those for the conventional Icarus emulator in that only configurations like topology and content requests can be initialized. In this case, no caching strategy is configured, and caching decisions can be made in the experiment execution part. Then, the required training data is collected from emulator 1010. After collection, these training data can be stored in storage pool 1140, and the preprocessing process can also be executed in this module. After preprocessing, the training data will be sent and fed to a training module. Finally, trained reinforcement learning model of agent 1030 can update the value function, and then this model can be used to generate more emulation results and start a new loop. Workflow 1100 will not terminate until a reward threshold is reached. In relevant test experiments, this framework has been used to test a reinforcement learning algorithm and has achieved satisfactory results.

In some embodiments, emulator 120 utilized in embodiments of the present disclosure not only can be used to train agent 130, but also can be used to test the performance parameters of agent 130 after the training of agent 130 is completed. More generally, emulator 120 can be used to perform any test of an agent used to perform caching decisions in a network. By using emulator 120 to test agent 130 (or any other agent), the performance of agent 130 (or any other agent) can be flexibly and conveniently measured, thereby providing a basis for judging the training effect of agent 130 and the performance of other agents. An example process for testing agent 130 based on emulator 120 will be described below with reference to FIG. 12.

Figure 12:
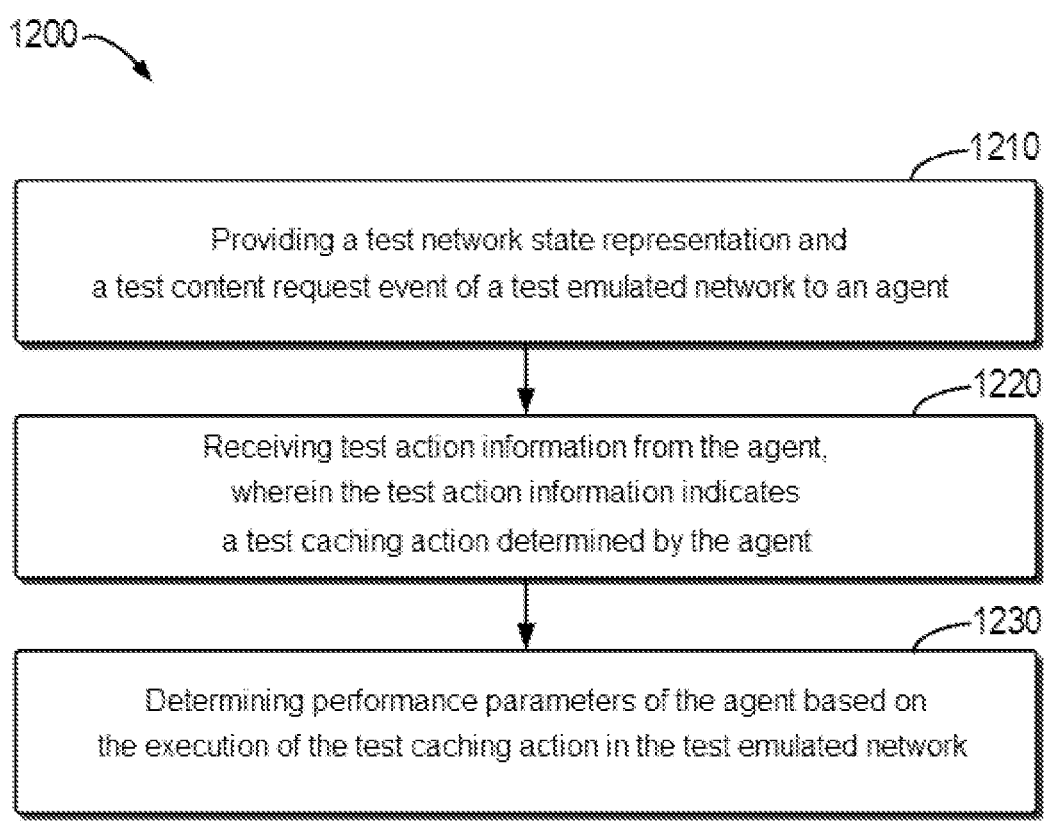
FIG. 12 illustrates a flow chart of an example process of using an emulator to test performance parameters of an agent according to embodiments of the present disclosure.

FIG. 12 illustrates a flow chart of example process 1200 of using emulator 120 to test performance parameters of agent 130 according to embodiments of the present disclosure. In some embodiments, process 1200 can be implemented by emulator 120 in computing device 110 in environment 100. For example, it can be implemented by a processor or processing unit for implementing emulator 120 in computing device 110, or by various functional modules for implementing emulator 120 in computing device 110. In other embodiments, process 1200 can also be implemented by an emulator in a computing device independent of environment 100, or can be implemented by other units or modules for implementing an emulator in environment 100.

At block 1210, emulator 120 can provide a test network state representation and a test content request event of test emulated network 140 to agent 130. For example, the test network state representation and the test content request event may be similar to network state representation 122 and content request event 124 described above, respectively, with the difference being that the two are used for testing and training, respectively. Therefore, detailed descriptions of the content and related processes of the test network state representation and the test content request event will be omitted. At block 1220, emulator 120 can receive test action information from agent 130, wherein the test action information indicates a test caching action determined by agent 130. For example, the test action information may be similar to action information 126 described above, with the difference being that the two are used for testing and training, respectively. Therefore, detailed descriptions of the content and related process of the test action information will be omitted.

At block 1230, emulator 120 can determine performance parameters of agent 130 based on the execution of the test caching action in test emulated network 140. For example, the test caching action can be similar to the caching action described above, with the difference being that the two are used for testing and training, respectively. Therefore, detailed descriptions of the content and related process of the test caching action will be omitted. In some embodiments, the performance parameters of agent 130 may include a Q-value of each test action given for agent 130. The Q-value may be determined based on relevant caching and transmission performance parameters of the content in emulated network 140. For example, such performance parameters may include cache hit rate and link load, among others. In addition, it should be noted that since example process 1200 is used to test the performance of agent 130, during example process 1200, emulator 120 may not provide the reward value generated based on the reward function to agent 130.

Figure 13:
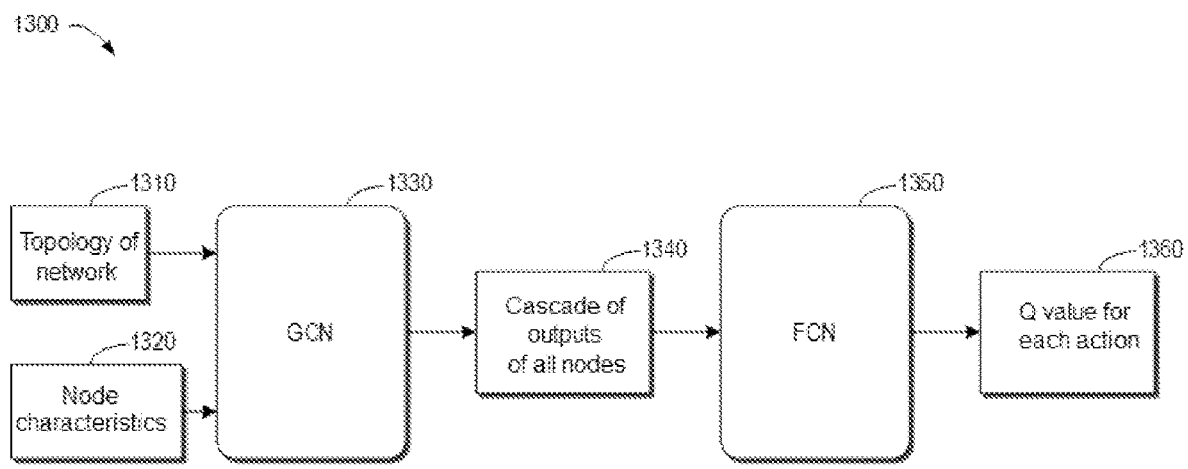
FIG. 13 illustrates a Q-network architecture for training and testing an agent according to embodiments of the present disclosure.

FIG. 13 illustrates Q-network architecture 1300 for training and testing agent 130 according to embodiments of the present disclosure. As shown in FIG. 13, in Q-network architecture 1300, topology 1310 and node characteristics 1320 of the network can be input to graph convolutional neural network (GCN) 1330 so that cascade 1340 of outputs of all nodes can be obtained. This cascade 1340 can then be input to fully connected neural network (FCN) 1350, so that Q value 1360 for each action can be obtained. In a test experiment, Q-learning can be used to train the reinforcement learning agent. Q-learning can be based on the Q-network architecture shown in FIG. 13. As shown in FIG. 13, for the topology information of the network (e.g., an ICN), GCN 1330 can be used as a feature extractor, and then FCN 1350 can be used to obtain final Q value 1360. In this test experiment, the average cache hit rate and the link load are compared with those of a least recently used (LRU) and leave copy down (LCD) method, and the experiment results are shown in FIGS. 14A and 14B.

Figure 14A:
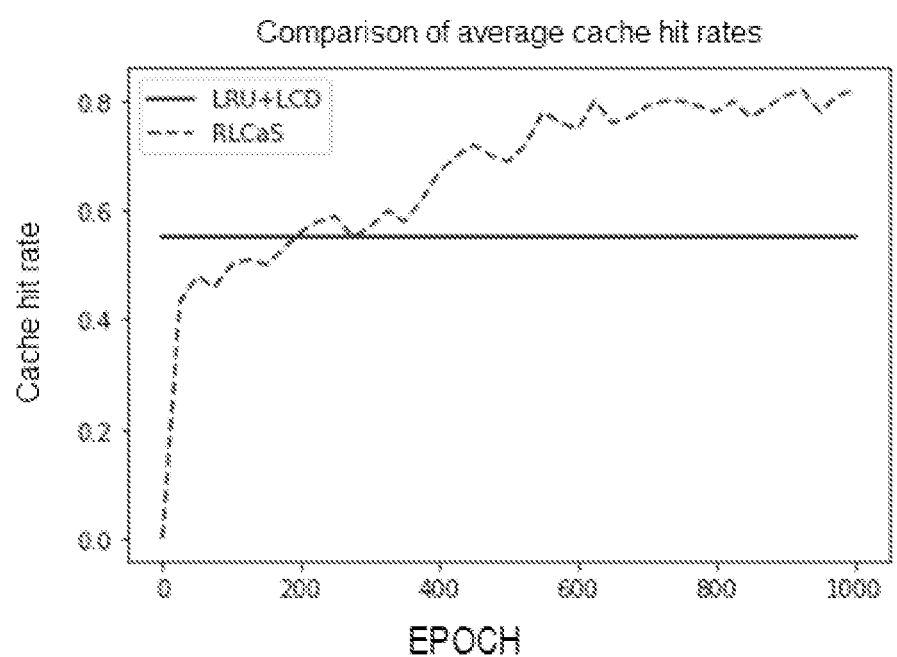
FIGS. 14A and 14B illustrate two experiment results of the performance comparison between embodiments according to the present disclosure and a conventional method, respectively.
Figure 14B:
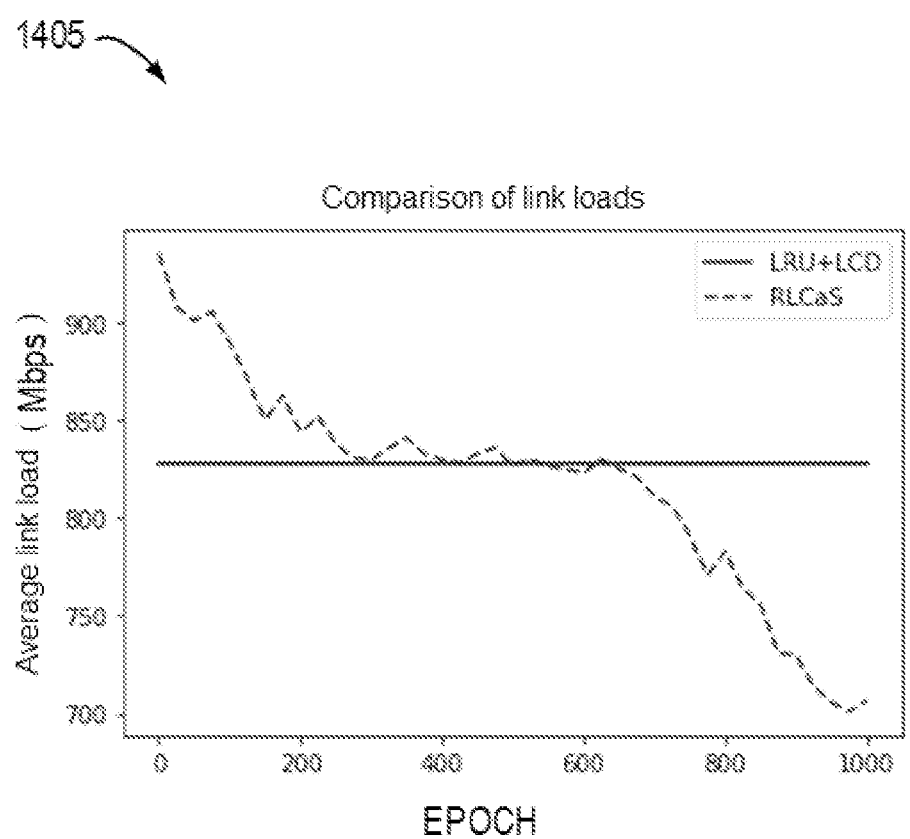

FIGS. 14A and 14B illustrate two experiment results 1400 and 1405 of the performance comparison between embodiments according to the present disclosure and a conventional method, respectively. In FIG. 14A, a comparison between the method (RLCas) of embodiments of the present disclosure and the conventional LRU and LCD method in terms of cache hit rate is shown, with the horizontal axis being the number of epochs of the training and the vertical axis being the cache hit rate of the test. In FIG. 14B, a comparison between the method (RLCas) of embodiments of the present disclosure and the conventional LRU and LCD method in terms of link load is shown, with the horizontal axis being the number of epochs of the training and the vertical axis being the link load of the test. As can be seen from FIGS. 14A and 14B, the test results of embodiments of the present disclosure outperform those of the conventional LRU+LCD method and are competitive relative to the state-of-the-art methods in the field.

Figure 15:
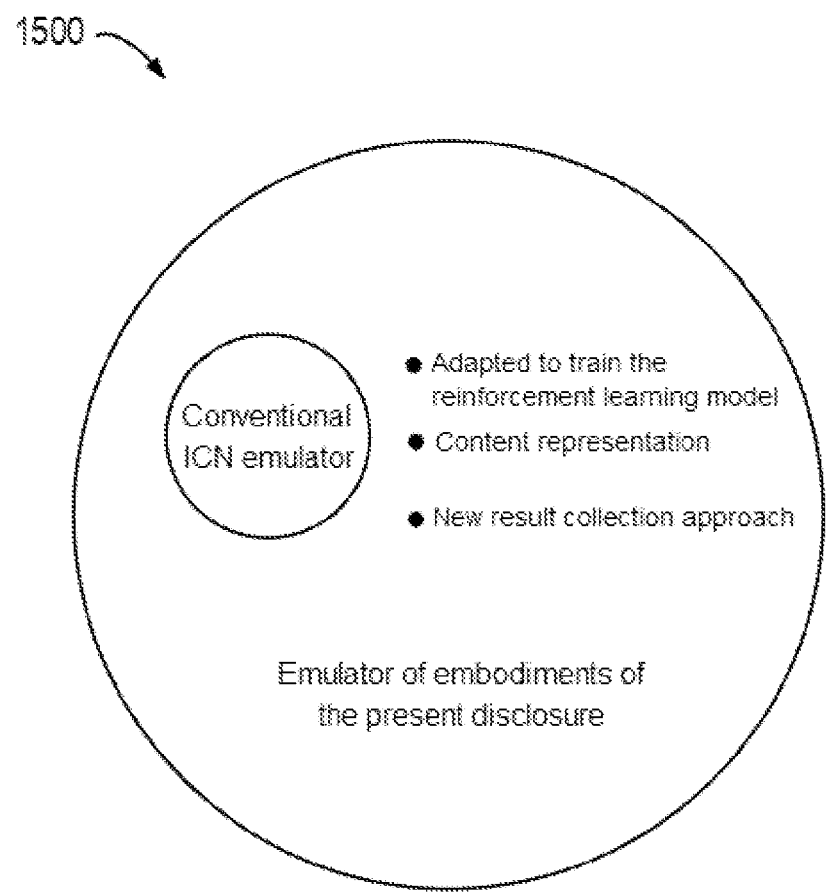
FIG. 15 illustrates a number of improvements implemented by an emulator according to embodiments of the present disclosure relative to a conventional emulator for an ICN.

FIG. 15 illustrates a number of improvements 1500 implemented by an emulator according to embodiments of the present disclosure relative to a conventional ICN emulator (e.g., Icarus). As mentioned above, in some implementations, the emulator of embodiments of the present disclosure can be implemented by improving a conventional ICN emulator, for example, thereby resulting in emulator 1010 illustrated in FIG. 10. More specifically, in order to train and test reinforcement learning strategies for caching decisions, emulator 1010 can be considered as an improvement to a conventional Python-based ICN emulator in terms of reinforcement learning algorithm training. In this regard, FIG. 15 clearly illustrates a number of differences or improvements 1500 between emulator 1010 and the conventional ICN emulator.

As shown in FIG. 15, emulator 1010 of the present disclosure has all the functions of a reinforcement learning training environment, including, for example, input, output, environment settings, and data processing workflow, which are not included in the original Icarus emulator. In addition, emulator 1010 of the present disclosure is also provided with additional functions such as content representation to make the training results more reliable. In addition, major contributions further include providing an easy-to-use reinforcement learning emulator 1010 for ICN caching systems, which can perform ICN emulation as well as reinforcement learning training, and almost any reinforcement learning algorithm aimed at finding a better caching system can be trained and tested. Specifically, in the process of adapting the original Icarus emulator, emulator 1010 of the present disclosure has three main improvements. The first one is the RL design, that is, the input and output of reinforcement learning emulator 1010 are designed to have the same formats as other reinforcement learning emulators. Then, reinforcement learning researchers can easily use emulator 1010 to test their algorithms, just like using Gym API of OpenAI. An improvement in another aspect is the more detailed representation. For example, the original Icarus emulator may omit some details, while embodiments of the present disclosure add more details (which are useful during RL training) to emulator 1010 to represent the ICN state more comprehensively. A further improvement lies in the new training framework, which adjusts the workflow of the Icarus emulator for use in general reinforcement learning training.

Figure 16:
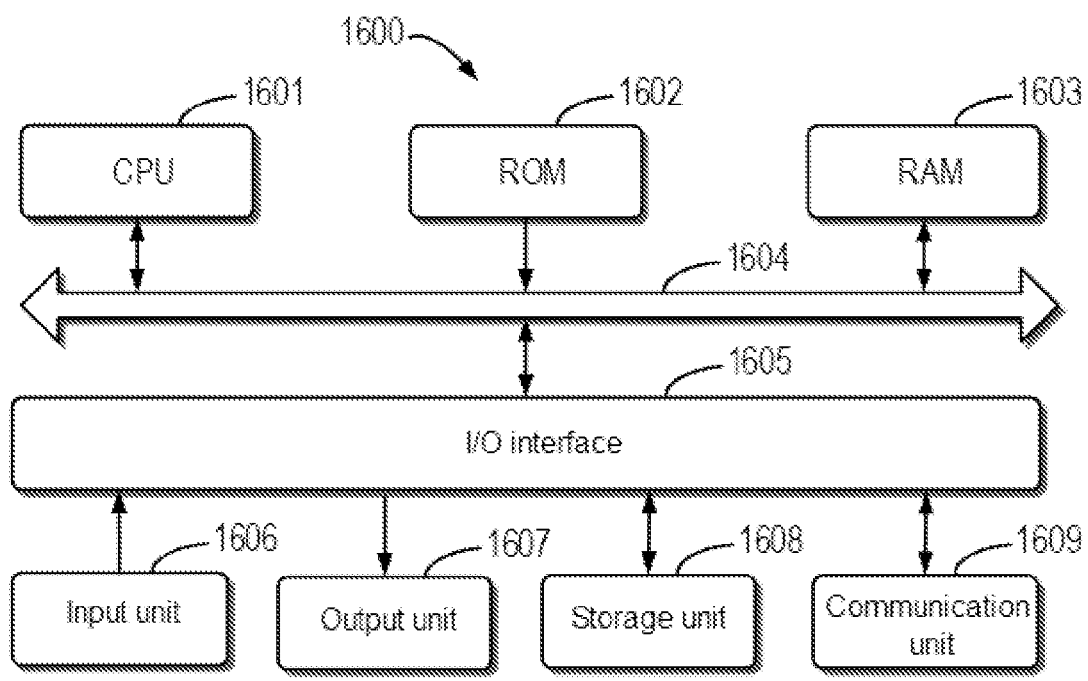
FIG. 16 illustrates a block diagram of an example device that can be used to implement embodiments of the present disclosure.

FIG. 16 illustrates a block diagram of example device 1600 that can be used to implement the embodiments of the present disclosure. In some embodiments, device 1600 may be an electronic device that can be used to implement computing device 110 in FIG. 1. As shown in FIG. 16, device 1600 includes central processing unit (CPU) 1601 that may perform various appropriate actions and processing according to computer program instructions stored in read-only memory device (ROM) 1602 or computer program instructions loaded from storage unit 1608 into random access memory device (RAM) 1603. In RAM 1603, various programs and data required for operations of device 1600 may also be stored. CPU 1601, ROM 1602, and RAM 1603 are connected to each other through bus 1604. Input/output (I/O) interface 1605 is also connected to bus 1604.

Multiple components in device 1600 are connected to I/O interface 1605, including: input unit 1606, such as a keyboard and a mouse; output unit 1607, such as various types of displays and speakers; storage unit 1608, such as a magnetic disk and an optical disc; and communication unit 1609, such as a network card, a modem, and a wireless communication transceiver. Communication unit 1609 allows device 1600 to exchange information/data with other devices over a computer network such as the Internet and/or various telecommunication networks.

The various processes and processing described above, such as example methods or example processes, may be performed by CPU 1601. For example, in some embodiments, various example methods or example processes may be implemented as a computer software program that is tangibly contained in a machine-readable medium such as storage unit 1608. In some embodiments, part or all of the computer program may be loaded and/or installed onto device 1600 via ROM 1602 and/or communication unit 1609. When the computer program is loaded into RAM 1603 and executed by CPU 1601, one or more steps of the example method or example process described above may be executed.

As used herein, the term "include" and similar terms thereof should be understood as open-ended inclusion, i.e., "including but not limited to." The term "based on" should be understood as "based at least in part on." The term "one embodiment" or "this embodiment" should be understood as "at least one embodiment." The terms "first," "second," and the like may refer to different or identical objects. Other explicit and implicit definitions may also be included below.

As used herein, the term "determine" encompasses a variety of actions. For example, "determine" may include operating, computing, processing, exporting, surveying, lookup (e.g., looking up in a table, a database, or another data structure), identifying, and the like. In addition, "determine" may include receiving (e.g., receiving information), accessing (e.g., accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part can be implemented using dedicated logic; the software part can be stored in a memory and executed by an appropriate instruction execution system, such as a micro-processor or dedicated design hardware. Those skilled in the art can understand that the above-mentioned devices and methods can be implemented by using computer-executable instructions and/or by being included in processor control code which, for example, is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flow charts can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. On the contrary, the features and functions of one apparatus described above can be embodied by further dividing the apparatus into multiple apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the appended claims.

What is claimed is:

1. An information processing method, comprising:
providing a first network state representation and a first content request event of an emulated network from an emulator to an agent for reinforcement learning, the emulated network being generated by the emulator as a software-based emulation that is distinct from any corresponding actual physical network, wherein the first content request event indicates that a request node in the emulated network requests target content stored in a source node;
receiving first action information from the agent, wherein the first action information indicates a first caching action determined by the agent, the first caching action including caching the target content in at least one caching node between the request node and the source node; and
collecting, based on execution of the first caching action in the emulated network, first training data for training the agent;
wherein the first caching action is selected from at least a first set of actions that is represented using at least a first set of indicators, the number of indicators in the first set of indicators being based on the number of nodes of the emulated network, and each indicator indicating whether at least one corresponding node will cache the target content.

2. The method according to claim 1, wherein the first training data includes the first network state representation, the first action information, and a reward value for the first caching action.

3. The method according to claim 2, wherein the reward value is determined based on a reward function of the emulator, the reward function being based on at least one of the following: a hit rate of the cached content, an average latency of the requested content, and a bandwidth occupied by transmitting the requested content.

4. The method according to claim 3, wherein the hit rate, the average latency, and the bandwidth each have an adjustable weight in the reward function.

5. The method according to claim 1, further including:
updating the first network state representation based on the first caching action to determine a second network state representation of the emulated network;
providing the second network state representation and a second content request event to the agent;
receiving second action information from the agent, wherein the second action information indicates a second caching action determined by the agent; and
collecting, based on execution of the second caching action in the emulated network, second training data for training the agent.

6. The method according to claim 5, further including:
providing, according to a determination that a number of collected pieces of training data reaches a predetermined number, the predetermined number of the collected pieces of training data to the agent.

7. The method according to claim 6, further including:
initializing the emulator to determine the first network state representation, the first content request event, and the predetermined number.

8. The method according to claim 1, further including:
executing the first caching action in the emulated network based on a time step determined by a time-step function of the emulator.

9. The method according to claim 1, further including:
storing the first training data according to a determination that the first training data is collected; and
performing preprocessing on the first training data.

10. The method according to claim 1, further including:
providing a test network state representation and a test content request event of a test emulated network to the agent;
receiving test action information from the agent, wherein the test action information indicates a test caching action determined by the agent; and
determining performance parameters of the agent based on execution of the test caching action in the test emulated network.

11. The method according to claim 1, wherein the first network state representation includes a network topology and node characteristics.

12. The method according to claim 11, wherein the node characteristic includes at least one of the following: a node type, whether there is content cached in a node, a content identifier of content in a node, and content characteristics of content in a node.

13. The method according to claim 12, wherein the content characteristics include at least one of the frequency of requests for the content, the time when the content was cached, and the recent popularity of the content, the recent popularity being determined based on the frequency of requests and the time when the content was requested last time.

14. The method according to claim 1, wherein the first set of indicators comprises a first set of bits, the number of bits in the first set of bits being equal to the number of nodes of the emulated network, and each bit indicating whether the corresponding node will cache the target content.

15. The method according to claim 1, wherein if the agent targets the emulated network, the number of actions in the first set of actions depends on the number of nodes in the emulated network.

16. The method according to claim 1, wherein if the agent targets a node in the emulated network, the first set of actions includes two actions.

17. An information processing method, comprising:
providing a first network state representation and a first content request event of an emulated network from an emulator to an agent for reinforcement learning, wherein the first content request event indicates that a request node in the emulated network requests target content stored in a source node;
receiving first action information from the agent, wherein the first action information indicates a first caching action determined by the agent, the first caching action including caching the target content in at least one caching node between the request node and the source node; and
collecting, based on execution of the first caching action in the emulated network, first training data for training the agent;
wherein the first caching action is selected from a set of actions, and an action in the set of actions indicates caching the target content in a target storage area in a node, wherein if the agent targets the emulated network, the number of actions in the set of actions depends on the number of nodes in the emulated network and the number of storage areas in the node, and wherein if the agent corresponds to a node in the emulated network, the number of actions in the set of actions depends on the number of storage areas of the node.

18. The method according to claim 1, wherein the emulator is implemented in one single computing device.

19. An electronic device, comprising:
at least one processor; and
at least one memory coupled to the at least one processor and storing computer program instructions, wherein the computer program instructions, when executed by the at least one processor, cause the electronic device to:
provide a first network state representation and a first content request event of an emulated network from an emulator to an agent for reinforcement learning, the emulated network being generated by the emulator as a software-based emulation that is distinct from any corresponding actual physical network, wherein the first content request event indicates that a request node in the emulated network requests target content stored in a source node;
receive first action information from the agent, wherein the first action information indicates a first caching action determined by the agent, the first caching action including caching the target content in at least one caching node between the request node and the source node; and
collect, based on execution of the first caching action in the emulated network, first training data for training the agent;
wherein the first caching action is selected from at least a first set of actions that is represented using at least a first set of indicators, the number of indicators in the first set of indicators being based on the number of nodes of the emulated network, and each indicator indicating whether at least one corresponding node will cache the target content.

20. A computer program product tangibly stored on a non-transitory computer-readable medium and including machine-executable instructions, wherein the machine-executable instructions, when executed by a machine, cause the machine to perform actions comprising:
providing a first network state representation and a first content request event of an emulated network from an emulator to an agent for reinforcement learning, the emulated network being generated by the emulator as a software-based emulation that is distinct from any corresponding actual physical network, wherein the first content request event indicates that a request node in the emulated network requests target content stored in a source node;
receiving first action information from the agent, wherein the first action information indicates a first caching action determined by the agent, the first caching action including caching the target content in at least one caching node between the request node and the source node; and
collecting, based on execution of the first caching action in the emulated network, first training data for training the agent;
wherein the first caching action is selected from at least a first set of actions that is represented using at least a first set of indicators, the number of indicators in the first set of indicators being based on the number of nodes of the emulated network, and each indicator indicating whether at least one corresponding node will cache the target content.

* * * * *